US006477508B1

(12) United States Patent
Lazar et al.

(10) Patent No.: US 6,477,508 B1
(45) Date of Patent: Nov. 5, 2002

(54) SYSTEM AND APPARATUS FOR BROADCASTING, CAPTURING, STORING, SELECTING AND THEN FORWARDING SELECTED PRODUCT DATA AND VIEWER CHOICES TO VENDOR HOST COMPUTERS

(76) Inventors: Clifford W. Lazar, 9717 Cisco St., Los Angeles, CA (US) 90034-1053; Paul M. Meadows, 5030 N. Hill St., La Cañada Flintridge, CA (US) 91011-2335

( * ) Notice: Subject to any disclaimer, the term of this patent is extended or adjusted under 35 U.S.C. 154(b) by 0 days.

(21) Appl. No.: 09/035,649

(22) Filed: Mar. 5, 1998

Related U.S. Application Data

(60) Provisional application No. 60/062,948, filed on Oct. 9, 1997.

(51) Int. Cl.[7] .............................................. G06F 17/00
(52) U.S. Cl. .......................... 705/26; 725/110; 725/141
(58) Field of Search ............................... 348/8, 12, 13, 348/17, 906, 734, 552, 10, 5.5; 455/5.1, 4.2, 6.2, 6.3; 705/26; 725/141, 153, 110, 112, 133, 134

(56) References Cited

U.S. PATENT DOCUMENTS 4,107,735 A * 8/1978 Frohbach ...................... 358/84
4,736,094 A * 4/1988 Yoshida ....................... 235/379

(List continued on next page.)

FOREIGN PATENT DOCUMENTS

| EP | 0776132 A2 | * | 5/1997 |
| EP | 0788710 | * | 2/1999 |
| JP | 409305656 A | * | 11/1997 |
| WO | WO 9613119 | * | 2/1996 |

OTHER PUBLICATIONS

Derwent–ACC–No.2001–181051; Knowlton, K.C. et al., Oct. 2000.*

Dialog File 636, Access No. 02693699, M2 Presswire, "General Instrument To Incorporate Zing Technology", Apr. 10, 1995.*

*Primary Examiner*—James P. Trammell
*Assistant Examiner*—Pierre E. Elisca
(74) *Attorney, Agent, or Firm*—Fitch, Even, Tabin & Flannery

(57) ABSTRACT

A Broadcast Marketing System (BMS) creates, transmits, captures, stores and forwards selected home shopping product ordering information in a manner that increases the likelihood that a TV or radio viewer/listener will order a product promoted on a direct response commercial. A Broadcast Provider transmits an enhanced broadcast commercial that is coded with information that identifies the product being featured in the commercial, a telephone number of an order-taking computer, and the call letters of the broadcast station that broadcasts the enhanced commercial. The enhanced commercial is received by a TV or radio or other receiver and broadcast for viewing/listening by a user. The user is provided with a specially-configured Remote Unit (RU), resembling a typical TV remote control unit. The RU allows the user to select for purchase those products or services described in the enhanced commercial by simply depressing a button on a keypad of the RU during broadcast of the enhanced commercial.

6 Claims, 25 Drawing Sheets

U.S. PATENT DOCUMENTS

| | | | |
|---|---|---|---|
| 4,802,022 A | * 1/1989 | Harada | 358/349 |
| 4,890,108 A | 12/1989 | Dori et al. | 341/176 |
| 5,128,752 A | 7/1992 | Von Kohorn | 358/84 |
| 5,138,649 A | 8/1992 | Krisbergh et al. | 379/56 |
| 5,227,874 A | 7/1993 | Von Kohorn | 358/84 |
| 5,249,044 A | 9/1993 | Von Kohorn | 358/86 |
| 5,255,313 A | 10/1993 | Darbee | 379/102 |
| 5,262,860 A | 11/1993 | Fitzpatrick et al. | 358/142 |
| 5,285,278 A | 2/1994 | Holman | 358/142 |
| 5,373,315 A | 12/1994 | Dufresne et al. | 348/2 |
| 5,382,970 A | 1/1995 | Kiefl | 348/1 |
| 5,410,326 A | * 4/1995 | Goldstein | 348/134 |
| 5,438,355 A | * 8/1995 | Palmer | 348/1 |
| 5,451,998 A | 9/1995 | Hamrick | 348/13 |
| 5,457,807 A | 10/1995 | Weinblatt | 455/2 |
| 5,469,206 A | 11/1995 | Strubbe et al. | 348/7 |
| 5,475,585 A | 12/1995 | Bush | 364/401 |
| 5,497,185 A | 3/1996 | Dufresne et al. | 348/2 |
| 5,500,681 A | 3/1996 | Jones | 348/473 |
| 5,504,519 A | 4/1996 | Remillard | 348/7 |
| 5,508,731 A | * 4/1996 | Kohorn | 348/1 |
| 5,515,270 A | 5/1996 | Weinblatt | 364/405 |
| 5,552,837 A | 9/1996 | Mankovitz | 348/734 |
| 5,570,295 A | * 10/1996 | Isenberg et al. | 379/90.01 |
| 5,574,963 A | 11/1996 | Weinblatt et al. | 455/2 |
| 5,581,800 A | 12/1996 | Fardeau et al. | 455/2 |
| 5,848,399 A | * 12/1998 | Burke | 705/27 |
| 5,872,588 A | * 2/1999 | Aras et al. | 348/1 |
| 5,872,589 A | * 2/1999 | Morales | 348/13 |
| 5,995,155 A | * 11/1999 | Schindler et al. | 348/461 |

* cited by examiner

SYSTEM AND APPARATUS FOR BROADCASTING, CAPTURING, STORING, SELECTING AND THEN FORWARDING SELECTED PRODUCT DATA AND VIEWER CHOICES TO VENDOR HOST COMPUTERS

This application claims the benefit of U.S. provisional application Ser. No. 60/062,948, filed Oct. 9, 1997.

BACKGROUND OF THE INVENTION

The present invention relates to a broadcast marketing system, and the elements thereof. More particularly, the invention relates to a system and apparatus for broadcasting, capturing, storing, selecting and then forwarding product data and viewer choices to vendor host computers for order fulfillment and viewer choice data collection. Additionally, the present invention relates to a system and apparatus for favorably influencing TV viewer and radio listener channel and station selections.

There are numerous marketing systems and tools known in the art for use with television (TV) or radio broadcasts. The most common and straightforward marketing technique is the ubiquitous TV or radio commercial, sometimes referred to as simply the TV/radio "ad" (short for advertisement). The TV/radio ad is carefully crafted by those skilled in the marketing arts to convey carefully selected information and/or to promote a particular vendor's product(s) and/or service(s). The desired end-result, of course, is that the viewer/listener will be sufficiently informed or entertained by the commercial to the point where he or she will attentatively watch or listen to the entire commercial, and as a result thereof, have his or her interest peaked sufficiently to either want to purchase or use the product or service described therein, seek out further information regarding such product and/or service, or at least remember the described product and/or service so that the vendor's products will be favorably considered for purchase or use at a later date.

Many vendors sell and promote their products directly, without a distribution chain. The commercials for such vendors may be specifically designed to elicit a "direct-response" from the viewer and/or listener by having the viewer/listener immediately telephone an indicated number, or write to an indicated address, in order to place an order for a product or service being described. Some TV networks, e.g., The Home Shopping Network, available on many cable TV systems, does nothing but continuously broadcast such direct-response advertisements.

Broadcast commercials are usually very effective at achieving their objectives. For that reason, broadcast providers, i.e., TV and radio networks and broadcast stations, are able to demand large sums of money for broadcast "time" during which a vendor's commercial will be broadcast. Such broadcast time may be, e.g., a relatively short 30 or 60 seconds, as is common with the ever-present TV/radio commercial, or may be much longer, e.g., 30 minutes, as is the case with the "infomercial."

Heretofore, when a television viewer wished to respond to a direct response ad and purchase the item shown or described, the viewer needed a pen and paper, a lighted room and a telephone. If the viewer happened to be watching or listening to the ad in the dark and did not have a pen and paper handy, it was unlikely that the viewer would or could respond to the ad.

To address this need, some cable companies provide set-top boxes, with direct telephone hook-ups, that allow for immediate ordering over a connected telephone line. Typically, such set-top boxes are used to order pay-per-view (PPV) events such as sports events or recent or classic movies.

Disadvantageously, when using a set-top box, a viewer must order during the commercial and cannot participate in a personal or business telephone conversation during the commercial (because the telephone line is busy making the order). Moreover, the set-top box must be permanently connected to the telephone system, which may require some technical skill, a special wall jack and a potential loss of privacy. Furthermore, typically only one set-top box exists per household, thus the set-top box may not be located, e.g., in the bedroom, where late night TV viewing is common. Additionally, the set-top box can only dial one telephone number, which limits the types of products and services that can be ordered through the box. Also, the set-top box is not able to interact with radio ads. Hence, it is evident that significant improvements are still needed in the way in which a viewer/listener can order products or services from a direct-response broadcast commercial.

In U.S. Pat. No. 5,262,860 (Fitzpatrick, et al.), there is described a home shopping device that involves connecting a set-top box to a personal computer with a connected modem to capture orders. As soon as the user presses a button or other device to evidence his or her interest in purchasing a product being shown or described (which by necessity occurs during the commercial or ad) the computer captures the order and then immediately dials a vendor's host computer so that the captured order may be transferred to the vendor. Disadvantageously, such system requires an expensive computer to perform this function, and the majority of households with televisions still do not have such a computer, many of those that do have a computer, do not have a modem, and those with a modem may be busy with the Internet or other on-line activities. Thus, many TV viewers, even if they have a telephone, are precluded from using such a system. Moreover, once the user has placed his or her order, there is no convenient way for the user to change his or her mind.

No current receiving device known to the applicants will allow a radio listener, driving in a car, to capture the product code, station call letters, and advertiser's phone number and then subsequently, after a listener-selected waiting period, safely order the desired product. The alternative is the pad of paper stuck to the windshield and a pen, if available. Because it is not safe for a driver to write while driving, and because there are always a large number of drivers who make up a significant portion of the radio listening audience, there is a need to provide drivers with a tool or device that allows them to safely capture marketing information broadcast over the air waves, and eventually use this information to place orders.

Thus, from the above, it is seen that there is a need in the art for a broadcast marketing system that allows a viewer/listener ("user"), wherever he or she may be, to conveniently and safely place an order for a product or service described in a broadcast commercial. Such a system should be available for use, at all hours of the day, by all users having a television or radio (or other broadcast receiver) in combination with a telephone, without requiring such user to have an expensive computer with a modem. Moreover, such a system should provide the user a waiting period during which he or she can rethink the order that has been captured and change his or her mind, if necessary.

An important element of any broadcast marketing system is the ability to control, at least to a limited extent, the stations or channels to which the viewer or listener is watching or listening. To that end, broadcast providers are continuously seeking programming material that appeals to a wider and ever-growing segment of the viewing/listening audience so that the product/service provider's commercials may be heard or seen by such ever-growing groups. Significantly, to the extent that the broadcast provider can assure the product/service provider a larger share of the viewing/listening audience, e.g., as occurs each year during broadcast of the "Super Bowl", the more the broadcast provider can charge for air time used to broadcast the product/service provider's commercial.

It is generally accepted that the viewer/listener should have final control over the stations or channels that are watched or heard. To this end, it is known in the art to provide, e.g., a television remote control unit that selects a preferred channel or station, activated by a designated single button on the unit. Moreover, many radios, including car radios, can be programmed to preferred stations which can be tuned in by pressing a single button. However, to the applicants' knowledge, there are no known remote control units, or programmable radios, that activate a product/service or broadcast provider's preferred channel or station at power-on. While some cable companies force a menu channel at power-on, such menu channel is typically so uninteresting that many viewers condition themselves to never look at it, and therefore immediately change the channel selection to a more interesting channel of choice. Moreover, the menu channel selection at power-on is not controlled by the relatively inexpensive remote unit, but is rather controlled by a set box, or by a signal from the cable company. What is needed, therefore, is a remote control unit that can be widely and inexpensively distributed to a large group of TV (or other broadcast receiver) owners, and which automatically, in an unassuming and unpretentious manner, always tunes the broadcast receiver to a preferred channel or station at power-on. Heretofore, all known systems, e.g., cable company systems, that select a preferred menu channel at power-on have always selected channels that are uninteresting, e.g., a menu channel. The viewer will be likely to appreciate skipping over the menu channel to a live interesting channel.

Disadvantageously, while some remote control units do provide a single button selection feature for selecting one or more preferred channels, some cable companies may, from time to time, re-assign channel numbers. Thus, permanently pre-programmed remote control units may become obsolete. There is thus a need in the art for a remote control unit that may be used as part of a broadcast marketing system and which can be reprogrammed in a secure manner, as needed.

Another important element of a broadcast marketing system is the ability to monitor the viewing and/or listening habits of the viewing/listening audience. To the applicants' knowledge, no current viewer/listener device keeps track of viewer channel selections in combination with viewer buying selections. Thus, a point-of-purchase device that could report viewer channel selections and product selections would represent a significant advance in the broadcast marketing art, and would provide a very valuable tool for advertisers and marketers. There is thus a need for such a device.

In U.S. Pat. No. 5,497,185 (Dufresne et al.), and in numerous other patents, there is shown a system that keeps track of the viewing habits of television viewers. The fact that numerous patents exist for such tracking systems suggests that none have proven very effective at their desired goal. Such systems are either too expensive or too cumbersome and inefficient to use. And even if used, such systems miss the mark because they provide the wrong information. It is not the amorphous viewing habits of the viewers that the product/service providers (the ones who effectively finance the broadcast providers) want or need to know. Rather, the desired information is the television viewing choices or habits of the product/service buyers. There is thus a need in the art for a broadcast marketing system that includes the ability to track the viewing choices of the those viewers who actually purchase advertised products or services.

SUMMARY OF THE INVENTION

The present invention provides a Broadcast Marketing System (BMS) that addresses the above and other needs. More particularly, the present invention relates to a BMS which creates, transmits, captures, stores and forwards home shopping product ordering information in a manner that increases the likelihood that a TV or radio viewer/listener (the "user") will order a product promoted on a direct response commercial. In addition, the BMS disclosed herein may be used to promote the development of leads in response to institutional ads.

In accordance with one aspect of the invention, a Remote Unit (RU), e.g., a specially configured, handheld, remote control unit, is provided as part of the BMS. Such Remote Unit (RU) is designed for use with a broadcast receiver (TV or radio). Among other features, the Remote Unit controls the turn-on channel/station selection. Advantageously, by controlling the turn-on channel/station selection, a marketable asset is created that is rentable or leasable by the BMS provider. Further, in order to make the Remote Unit more versatile in an ever-changing broadcast media market, the Remote Unit may be reprogrammed in a secure manner, e.g., over-the-air or while connected via an internal modem, by the BMS provider so that it tunes to one of a multiplicity of preferred channels at power turn-on; and/or so that preferred channel/station selection buttons on the Remote Unit (herein referred to as "hot" buttons) can be reprogrammed to a desired set of preferred channels or stations. In this manner, the preferred turn-on channel/station, as well as the "hot" button channels, may be changed from time to time, as needs or desires dictate. This capability to reprogram the Remote Unit represents another rentable or leasable asset for the BMS provider.

Advantageously, the channel or station to which the receiver is automatically tuned, when power is first turned on, carries its normal programming material. Thus, this material will vary from day-to-day and hour-to-hour and will rarely, if ever, be the same. Hence, the user will either not notice that the receiver is always tuned to the same station or channel at power-on; or, even if he or she does notice, will not care because the broadcast material will be "interesting" to watch or listen to, at least until the viewer/listener decides he or she wants to watch or listen to a different channel or station. Until such time, however, the present invention advantageously presents to the user a preferred channel or station, which allows the broadcast provider to put before the user its preferred channel.

Advantageously, the automatic tuning to a Preferred power-on channel is a powerful asset to the broadcaster/provider. It means that the user may turn off his/her TV set at night with the TV tuned to the channel of a competitor broadcaster, but that the TV will come on in the morning tuned to the channel of the provider/broadcaster. This marketing advantage should encourage the broadcaster/provider to distribute the BMS/RU to users free of charge or below cost. Alternatively, the Power-on channel selection can be rented to a television network by the RU provider. Because the RU is reprogrammable, the rental can be for a prescribed time period, e.g., one month, and thereafter terminated (reprogrammed to another preferred channel) if the rental fee is not paid.

In accordance with one aspect of the invention, the reprogrammable Remote Unit (RU) may be reprogrammed over the telephone, only when an authorized password is presented, during the placement of an order (i.e., when the Remote Unit is linked to an order-taking computer) or at the instigation of the viewer/user.

An advantage offered by the present invention is that the BMS may capture TV viewing (or radio listening) choices and product or service selections and make them available to subscribers. Here, "subscribers" means those companies or individuals who provide products or services to the viewer/listener and will value such information.

Another advantage of the BMS, the present invention, is that it may be configured to allow the user to participate in voter, public opinion, focus group and/or TV-watching/radio-listening surveys.

The main components or elements of a BMS made in accordance with the present invention include:

(1) an Enhanced Broadcast (TV or radio) commercial;
(2) a Remote Unit and associated equipment, e.g., telephone cradle, or other means for connecting with a telephone line;
(3) an Order-taking Host (remote) Computer; and/or
(4) a Provider's Host Computer. Each of these elements is briefly described below.

(1) The Enhanced Broadcast Commercial

The Enhanced Broadcast commercial comprises what appears to be an otherwise conventional broadcast commercial, but which also includes as an integral part thereof, e.g., embedded therewithin, an identification signal referred to as the "Pick Record" signal. The Pick Record signal can be captured by the Remote Unit, stored, and subsequently transmitted to an order-taking remote computer and/or provider's host computer. The Pick Record signal identifies important information related to the product or service described in the Enhanced Broadcast commercial, e.g., the product/service code, the telephone number of the remote computer (either the order-taking computer or the vendor's host computer) that is to be contacted if an order is placed, and the station's call letters. In a preferred embodiment, the Pick Record signal medium comprises a Dual Tone Multi-Frequency (DTMF) sequence that is broadcast during the Enhanced Broadcast commercial, e.g., at the end of the Enhanced Broadcast commercial. Advantageously, DTMF signals may be used as the Pick Record signal medium without any modification to existing TV or radio receivers. Further, DTMF signals are sufficiently unique so as to allow them to be readily "heard" by the Remote Unit, even in a less-than-quiet environment. Alternatively, the Pick Record signal may comprise other types of signals, such as infrared (IR) light signals, generated by a specially-configured Television or Radio receiver, or by devices added on to the TV or radio receiver. The disadvantage of using IR signals as the Pick Record signal is that such signals are not compatible with existing TV and radio receivers (i.e., most TV's on the market today include the ability to receive IR signals from the remote control unit, but they do not include the ability to transmit IR signals to the remote control unit); however, such alternate signals could readily be incorporated into a new generation of TV and radio receivers, or easily configured as add-on devices.

(2) The Remote Unit

The Remote Unit comprises a small, handheld, low power, transceiver that has the general appearance of a conventional remote control unit. Advantageously, however, the Remote Unit includes many features not found on a conventional remote control unit. For example, it may include up to four (or more) preferred channel selection buttons that each tune to a selected preferred channel or station when pressed. Likewise, the Remote Unit tunes to a preferred channel or station when power is first turned on to the broadcast receiver.

The Remote unit performs several functions. In general, these functions may be summarized as follows:

a) The Remote Unit selectively captures the Pick Record signal, e.g., it captures the DTMF tones (or other type of signal) that accompany the Enhanced Broadcast commercial when the viewer/listener ("user") makes one or more product selections. This captured information is stored within the Remote Unit and, at a time that is convenient to the user, the User selects the desired Pick Record and the Remote Unit dials the vendor's host computer. Once it contacts the host computer, it performs a handshake sequence with the host computer to establish a communication link. Once such a link is established, the Remote Unit uploads information to the host computer, e.g., the station viewing log, user-identification data, and product selections (Pick Record signals).

b) Typically, a special cradle, or equivalent (e.g., an RJ-11 jack that allows a conventional phone cable to connect the Remote Unit with a standard telephone RJ-11 jack in the user's home), is provided with the Remote Unit to facilitate establishing a telephone or other link between the Remote Unit and the host computer when the user is ready to send his/her order to the order-taking remote computer. Such cradle, or equivalent, establishes an electrical connection between the Remote Unit and the user's telephone line so that circuitry within the Remote Unit can dial the host computer.

c) The Remote Unit (RU), as indicated previously, tunes to the station selected by the provider of the RU at power-on. The RU also selects stations or channels with preferred buttons, programmed by the provider of the remote unit. The RU, as controlled by the user, also selects stations or channels by number buttons and up/down channel buttons.

d) The RU includes circuitry that accepts the vendor's host computer download of a station number to a preferred "last ordered from" button, if such vendor is authorized by the RU's provider and also downloads the correct date and time.

e) The RU may also accept download information from the provider's host computer that defines or redefines the channel/station numbers for the preferred buttons, as well as a password(s) and tables of product abbreviations. The password(s) is/are used with all downloading of information in order to assure that only authorized downloads occur. In this manner, the preferred channel buttons, as well as the password itself, can be reprogrammed from time to time, if necessary.

f) The RU uploads certain identifying information to the host computer that uniquely identifies it from all of the other RU's from which the host computer may receive information. Such identifying information typically includes, e.g., a serial number. The serial number identifies the RU, including the version of the RU, and may be used by the host computer to facilitate correlation of demographics and user identification. Thus, for example, the host computer may maintain a collection of user files, wherein a given serial number is assigned to a particular user's name, address, location, and other information (e.g., telephone number, credit card number, etc.) so that the computer can immediately correlate an uploaded product order (or other uploaded information, such as survey information) with a specific user.

g) The RU may accept code sequences to allow for reprogramming of the RU. That is, the RU functions may themselves be programmed or reprogrammed as circumstances and needs warrant. Thus, for example, the RU may be reprogrammed to accept a special application program that facilitates a survey response and data uploading, or other single-use applications or data uploading, not necessarily related to sales of products.

h) The RU contains start-up programming data that, if it detects no data for TV IR codes, will direct the RU to dial the provider's host computer and request a start-up sequence. The client representative will ask the user what brand and type of TV, Cable box and VCR he/she has and then the host computer will download the IR codes, power-on channel and hot button channels.

(3) The Order-taking Host Computer

The Order-taking Host computer, also sometimes referred to herein as the "remote computer", or the "host computer", is a conventional computer located at a vendor site, service-provider site, or contract fulfillment provider site that is typically located many miles distant from, and perhaps even many time-zones from, the location of the user. That is, while the user may live, e.g., in Los Angeles, Calif., the host computer may physically be located in another city and state, such as Denver, Colo.; Miami, Fla.; New York, N.Y.; Houston, Tex., or even another country, such as Germany or South Africa. The order-taking host computer is thus that distant computer with which the Remote Unit makes first contact when it calls the telephone number it receives as part of the Pick Record. There may be more than one order-taking host computer. The order-taking host computer is programmed to receive and process any information that is uploaded from the user's Remote Unit. For example, the order-taking host computer may be programmed to: accept the telephone call from the remote unit, handshake with the remote unit so as to establish a communication link therewith, accept the product Pick Record, and optionally interact with the Remote Unit to complete the order or to switch to or include a live operator to assist in completion of the order. Moreover, when authorized, the order-taking host computer may also upload the user's TV viewing log and product selections stored in the RU, if authorized by the provider. The order-taking host computer may also, when authorized, download a station number to the "last ordered from" button on the Remote Unit.

(4) The Provider's Host Computer

The Provider's Host computer is another distant computer that may be used as part of the Broadcast Marketing System described herein. Typically, the provider's host computer is owned and maintained by, or at least operated under contract with, the BMS service provider. The provider's host computer may optionally be used to reprogram the Remote Unit, based on the serial number assigned to the viewer/listener's RU, phone number, location and media market. For example, the provider's host computer may be used to program all remote units within a given geographical or market area with a certain preferred power-on channel or station. The provider's host computer may also optionally handle product orders for subscribing vendors, or may facilitate conducting surveys by responding to all RU's that have dialed a specified phone number. The provider's host computer may be, for some embodiments, the same computer as the order-taking host computer. That is, one computer may perform the functions of both the order-taking computer and the provider host computer.

Advantageously, it is an object of the present invention to provide a BMS that provides a low-cost store-and-forward device compatible with existing TV and radio receivers that facilitates home shopping by capturing product ordering information, even in the dark, without a pen or pencil, in a less-than-quiet environment, that can be used later to activate the order, via a telephone, with no special technical skill required by the user.

It is another object of the invention to provide a BMS that increases the effectiveness of all direct-response and institutional TV and radio advertising.

It is a feature of the invention, to tune a television set or radio receiver to a preferred channel or station when the TV or radio is first turned on (i.e., at "power-on" ), as selected by a rent-paying sponsor.

It is another feature of the invention to provide a Remote Unit for use with a TV or radio having reprogrammable, secure, hot buttons, i.e., preferred station or channel selection buttons. The reprogrammability of these buttons allows the Remote Unit to be adaptable as technology changes and as new stations/channels are introduced, channel designations are changed, and/or new appliances or devices enter the market place. The security of the hot buttons, which allows them to be reprogrammed only when a correct protective password is given, assures that the provider maintains control.

It is still another feature of the invention, in accordance with one embodiment thereof, to allow the user to participate in polled interactive real-time surveys.

It is an additional feature of the invention, in accordance with another embodiment thereof, to allow the user to capture or record audio text from a radio, television receiver or telephone and then have the choice to upload the text to a personal computer or to retransmit the text to another user via a telephone.

Still another feature of the invention is to provide a device that captures and maintains a log of the TV-viewing choices of the user, and that then transmits such log to the order-taking computer of the product advertiser. Such viewing log, in combination with a log of those products/services actually purchased by the user (maintained, e.g., by the order-taking host computer), would thereby provide meaningful and valuable marketing information. The present invention advantageously comprises a point-of-purchase device that can report viewer channel selections and product selections, thereby allowing advertisers and marketers to know what programs were actually watched by actual buyers. The advertisers and marketers would also be able to learn the purchasing patterns of buyers, including how much time elapses between purchases, dollar amounts, and types of products purchased.

It is a further feature of the invention to allow a radio listener, driving or riding in a car, to readily capture the product code, station call letters, and advertiser's phone number, and then subsequently order the desired product, all while safely driving in traffic. Such ability represents a significant improvement over existing techniques used by radio listeners traveling in a car, which techniques entail keeping a pad of paper and pen/pencil in the car where they are readily accessible, e.g., in a shirt pocket or on the dashboard, and then trying to write information on the paper while driving the car, all of which may distract the driver and create an unsafe condition.

BRIEF DESCRIPTION OF THE DRAWINGS

The above and other objects, features, and advantages of the present invention will be more apparent from the following more particular description thereof, presented in conjunction with the following drawings, wherein:

FIG. 5 is a flowchart that shows the TV on when no action has been taken with the RU for a while;

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing the general principles of the invention. The scope of the invention should be determined with reference to the claims.

The Broadcast Marketing System (BMS) invention described below generally relates to a television BMS. However, it is to be understood that the invention is not limited to just television, but may be used with many different types of broadcast systems and media, including radio, telephone, cable, satellite, internet, or similar systems that facilitate the transmission of information, including advertisements, from a broadcast provider to a user.

Figure 1A:
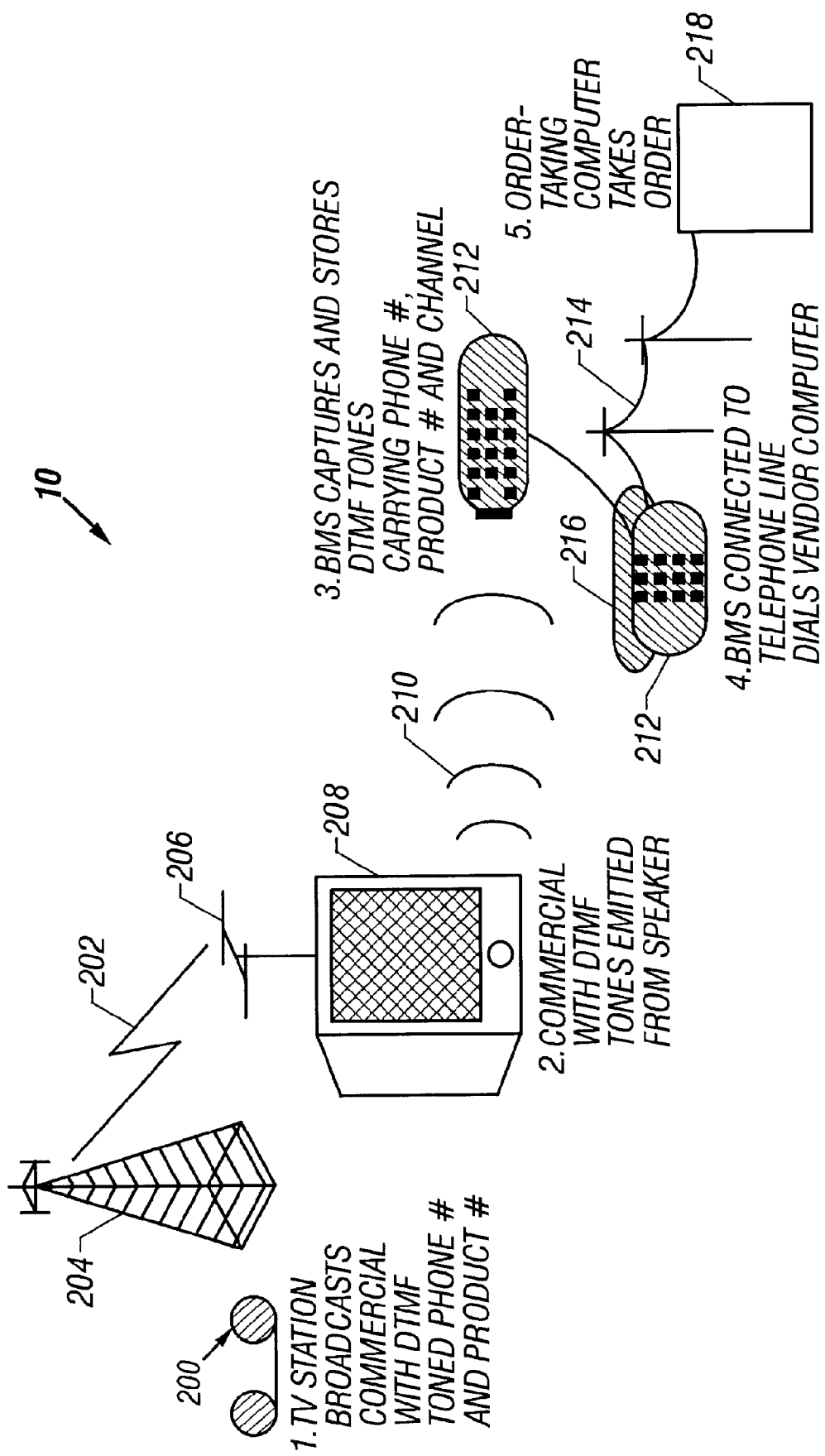
FIGS. 1A and 1B are block diagrams of the main components of the Broadcast Marketing System (BMS)

Referring first to FIG. 1A, there is illustrated an overview of the basic components used with a Broadcast Marketing System (BMS) 10 when applied to television. As seen in FIG. 1A, a TV station 200 broadcasts an enhanced TV Commercial (represented by the jagged line 202) from a TV broadcast antenna 204. The enhanced TV Commercial 202 includes DTMF tones that identify the fulfillment-computer phone number, product number associated with a product or service that is described in the commercial, and the call letters of the TV station.

The enhanced TV Commercial 202 is received through a television antenna 206 and coupled to a television receiver 208. (It is noted that while a broadcast television system is shown in FIG. 1A, wherein broadcast signals are transmitted from a transmitting antenna 202 and received by a receiver antenna 206, such is only exemplary. The BMS system may also be used with cable TV systems, satellite systems, or any other type of system used to couple a signal into a television or radio receiver.) The video portion of the enhanced TV Commercial is displayed on the TV screen of the television receiver 208. At the same time, the audio portion of the enhanced commercial, including the DTMF tones (represented in FIG. 1A by the wave-front lines 210), are emitted from a speaker of the TV receiver 208. If the user is interested in the product/service being displayed on the TV screen, then a button is pushed on a Remote Unit 212 that causes the Remote Unit 212 to capture and store the DTMF tones 210. These DTMF tones identify the phone number and product/service code number, as well as the station, associated with the enhanced commercial 202.

At a convenient time, e.g., the next day, the user connects the Remote Unit 212 to a telephone line 214, e.g., through use of a special cradle 216 or other interface, and the telephone number associated with the enhanced commercial that was captured is dialed. The telephone number activates an order-taking computer 218 at some distant location, thereby establishing a link over the telephone lines 214 with the Remote Unit 212. Once connection is made, the Remote Unit 212 uploads whatever information it has about the product/service that was captured, as well as identification information that identifies the user, e.g., the serial number of the RU 212 (which information, in turn, may be used to further identify the user from a user file maintained at the order-taking computer so as to provide, e.g., the user address, telephone number, credit card number, if an order is placed, etc.) Alternatively, once a link is established between the RU 212 and the order-taking computer 218, the user may actually speak to a person who takes the ordering information.

Figure 1B:
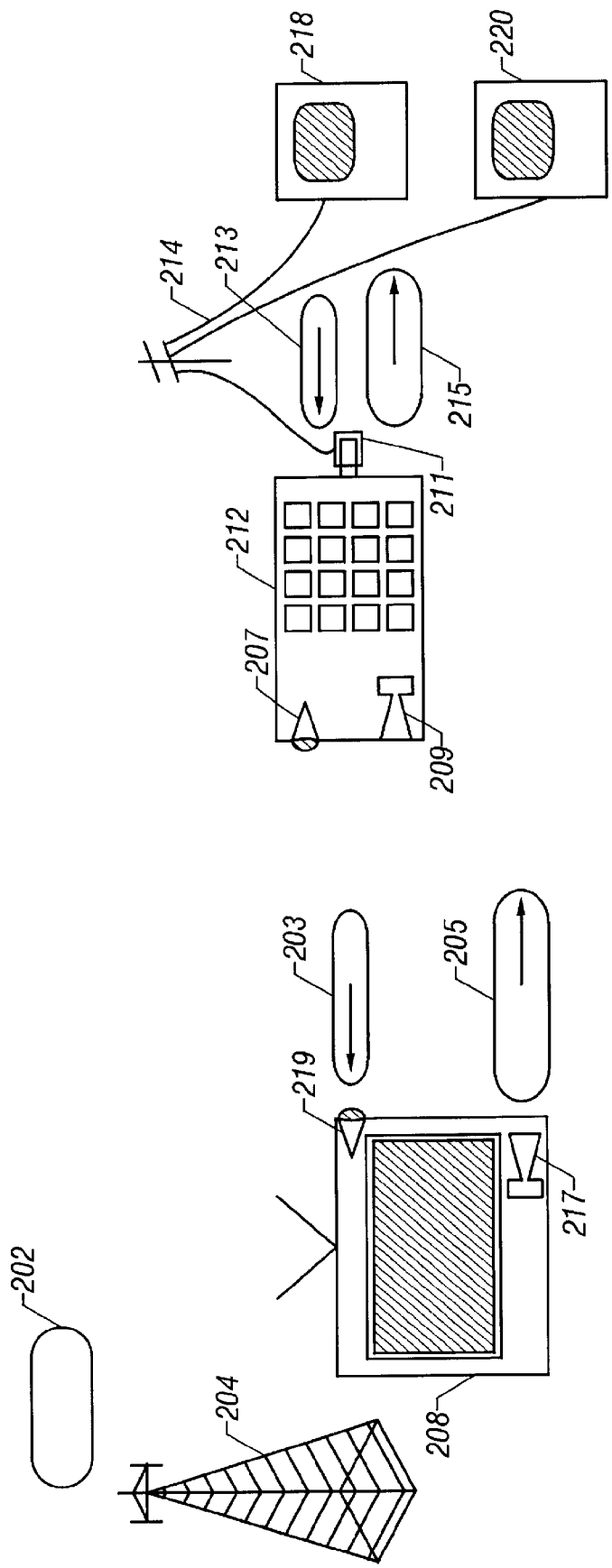

Turning next to FIG. 1B, there is shown a block diagram that illustrates many of the components or elements of the BMS 10. These elements include the Remote Unit 212, the enhanced broadcast commercial 202, the Vendor's order-taking Host Computer 218 and a Provider's Host Computer 220.

As seen in FIG. 1B, the user commands the nearby television 208 to turn on/turn off, change channels, and increase or decrease sound volume using control signals sent from an Infrared LED Emitter 207 that forms part of the Remote Unit 212. The control signals are contained in a sequence of coded IR pulses 203 which are received by an infrared sensor 219 which forms part of or is connected to the TV 208.

The television broadcast antenna 204 transmits the enhanced commercial 202 which contains the product number, the vendor's host computer phone number and the station call letters and error detection codes within a DTMF (Dual Tone Multi-Frequency) tone sequence, hereinafter referred to as the Pick Record 205. The Pick Record 205 is broadcast by a speaker 217 in a DTMF tone sequence as the DTMF Pick Record 205. The speaker 217 is included as part of, or is connected to, the TV 208.

In operation, it is thus seen that the advertiser broadcasts the enhanced commercial 202 from the broadcaster's antenna 204. This enhanced commercial 202 will contain a sequence of DTMF tones that make up the Pick Record 205. The Pick Record 205 will typically include:

- a start tone,
- formatting and/or framing information that identifies, e.g., the number of byte values to be included in the sequence to follow, which sequence will normally include
- a Product Number,
- a phone number of the (advertiser's) order-taking host computer, and
- the station call letters.

The enhanced commercial 202 includes its Pick Record 205, i.e., the sequence of DTMF (dual tone multifrequency) tones that identify the product number, order-taking phone number, and station call letters, as an integral part of the enhanced commercial 202. Typically, such DTMF sequence is sent at the conclusion of the commercial. These DTMF tones are the same tones used in touch-tone telephones. The DTMF Pick Record 205 is received by a DTMF Microphone 209 mounted within the RU 212. Once sensed by the microphone 209, and related circuitry, the Pick Record 205 is conveyed to a microprocessor (not shown in FIG. 1B) contained within the Remote Unit 212. The Pick Record 205 is processed by the microprocessor, if selected by the user as representing a product of interest, and is stored in a memory (also not shown in FIG. 1B) of the Remote Unit. A Pick Record 205 that has been selected by the user is referred to as a selected Pick Record 215.

The RU 212 includes an RJ-11 jack 211 that allows it to be coupled to a standard telephone jack. At the convenience of the user, connection is made with a conventional telephone line 214 through the Remote Unit's RJ-11 jack 211 by connecting into the local telephone through a conventional wall jack receptacle, or a specially designed cradle 216 (FIG. 1A). The user then transfers a selected Pick Record 215 by pressing a Dial Button located on a keypad of the RU 212. This action causes the Vendor's order-taking Host Computer phone number to be dialed. Once a phone connection has been established, the order-taking Host Computer 218 sends a handshake code sequence 213 to the Remote Unit 212 to verify that connection has been made. The Remote unit 212, in response, sends the selected Pick Record 215 to the order-taking Host Computer 218. The user may send as many selected Pick Records 215 as desired to the order-taking host computer, thereby affording the user an opportunity to change his/her mind relative to making a purchase, is desired. Further, as needed, the RU 212 may contact one or more additional computers 220, e.g., a provider's host computer 220, through the telephone lines 214.

In order to complete some of the details associated with placement of the order by the user, the order-taking Host Computer 218 may direct the Remote Unit (RU) 212 to prompt the user to pick up the telephone handset so that the user can talk with a person at the order-taking host computer site. Alternatively, the RU 212 may prompt the user to continue sending ordering data through the Remote Unit, e.g., by pressing specified keys. In this manner, the product order could be placed by a hearing-impaired user.

For example, if prompted to talk, the user would pick up the telephone handset and talk to a sales representative at the Advertiser's site. The user would confirm the product name and other pertinent product-selection information, the quantity, and then give the Sales Representative the user/buyer's credit card data. Alternatively, the user may maintain a "user file" at the order-taking host computer that contains all the needed user information, including the credit card data, to enable the user to purchase a product. In such instance, all the user need do is confirm that he/she wants to make the purchase, provide a password verification, and the order-taking computer would then gather the information it needs to complete the order from the previously-stored user file.

As an additional feature of the invention, the Advertiser's order-taking Host Computer 212 may send a command to the RU 212 to upload a Viewing Log maintained within the RU. Once uploaded, the user would hang up the telephone and remove the RU from its cradle 216 (FIG. 1A), if used, or disconnect the telephone connection from the RU jack 211 (FIG. 1B).

As indicated above, the Remote Unit 212 includes a memory. The RU's memory, shown and described in more detail below in conjunction with FIG. 10, may contain, but is not limited to:

- an RU Serial Number,
- a User Purchase history,
- a User phone number(s),
- a User Address,
- messages for the LCD display,
- a Product Pick Table (Product #, Phone # and Station Call Letters),
- a Viewing Log (Channels and Times),
- passwords for modification authorizations, and/or
- preferred TV channel numbers. Some of the above information may alternatively be stored in a "user file" maintained at the order-taking or other remote computer under the RU Serial Number.

Typically, the Remote Unit 212 will be preprogrammed at the factory. Alternatively, the RU may be reprogrammed by the host computer 218, or the provider's computer 220, while connected to the host computer 218 or 220 through the telephone link. Such reprogramming could occur as initiated by the user, or whenever the user places an order.

Advantageously, the RU 212 can also capture product Pick Records from enhanced commercials or advertisements that are broadcast through radio or telephone. Additionally, in one embodiment, the RU 212 may capture text in the form of DTMF tones from the TV, radio and/or the telephone.

It should also be noted that the RU 212 may also be coupled to the user's home computer so that the contents of the RU memory may be uploaded to the user's computer. Such uploading may occur, e.g., through a cable attached to the RU and the serial port of the computer.

As an additional feature, the RU 212 may also be connected to a telephone party line (or a "conference call" connection) and thereby participate in multi-person surveys and real-time response and TV viewing ratings surveys. In such instance, the host computer may poll the RU's by serial number which are connected by the conference call and request votes to be input by the RU's key pad.

Figures 1, 10:
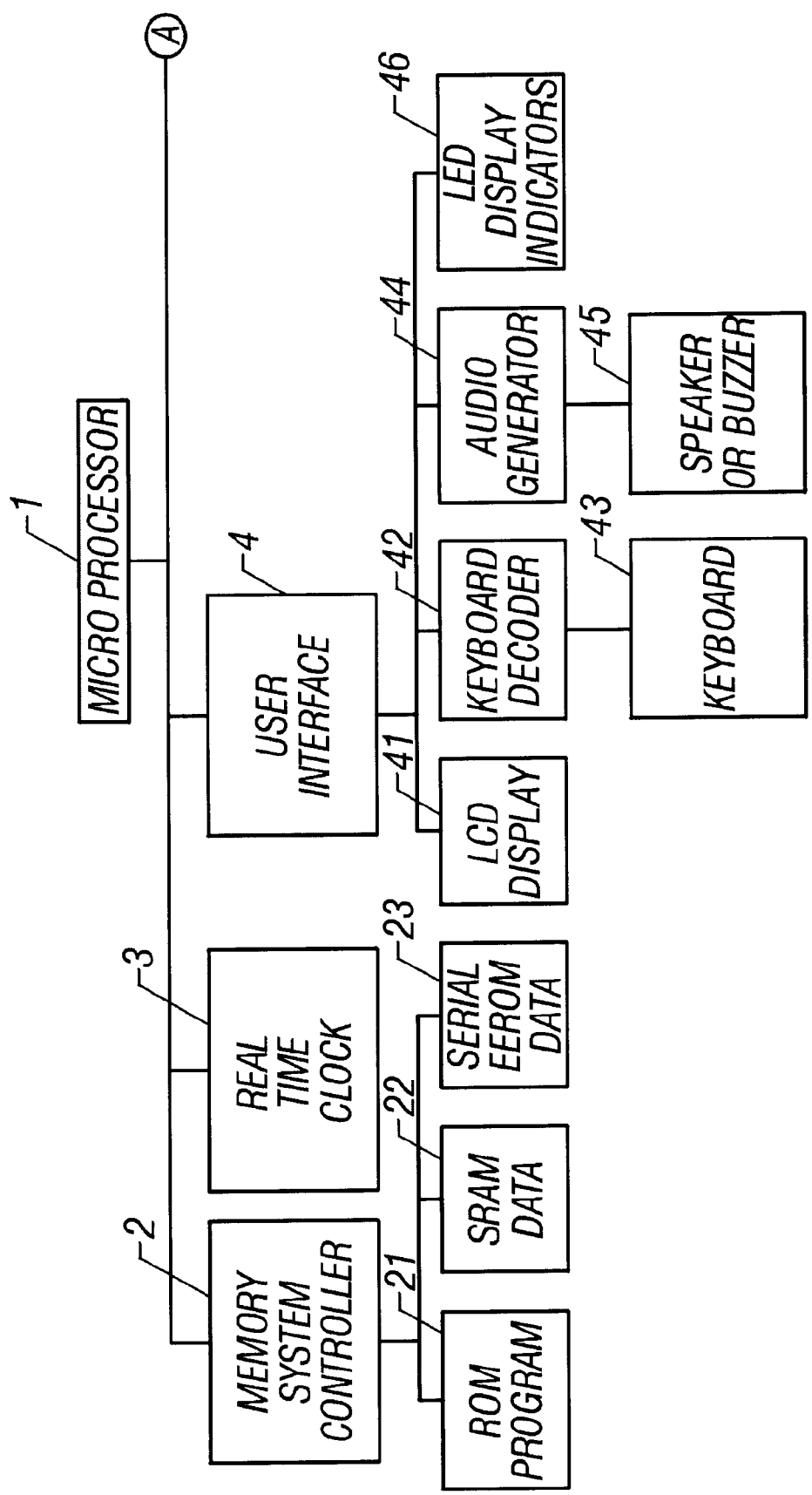
FIG. 10 shows a block diagram of the Remote Unit (RU) used with the BMS.
Figures 2, 10:
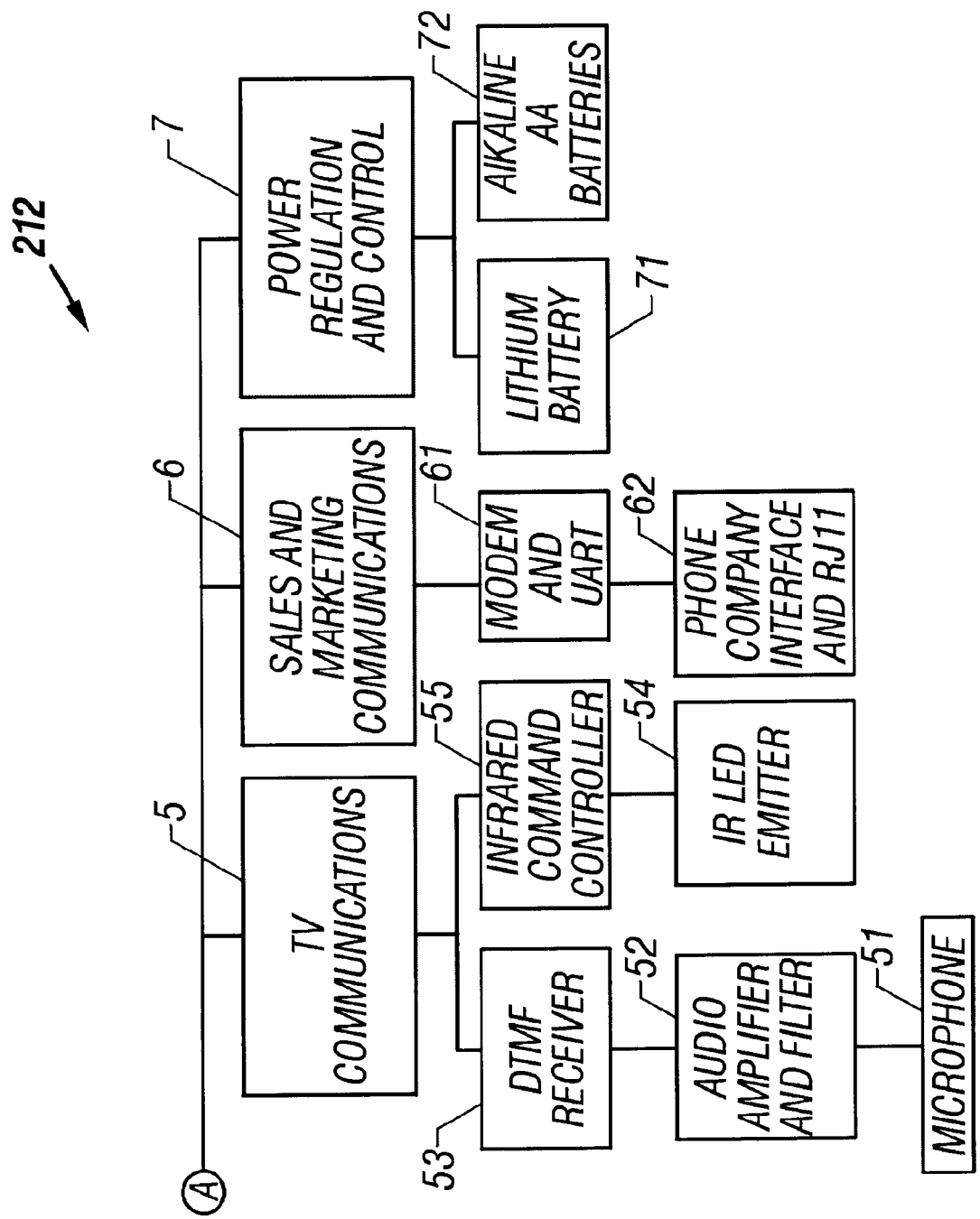

From the above description, it is evident that the Remote Unit (RU) 212 comprises a key element of the BMS invention. To better understand the features and elements included within the RU 212, reference is next made to FIG. 10, where is shown a block diagram of the RU 212. As seen in FIG. 10, the Broadcasting Marketing System/Remote Unit (RU) is a microprocessor-based system adapted to control the operation of a television set, receive product information from specially enhanced commercials, and to place orders for the products described in these commercials.

At the heart of the RU 212 device is a low power microprocessor 1 which controls the operation of the device. The microprocessor 1 is shown on the top row of the elements depicted in FIG. 10 to emphasize that the microprocessor controls all of the other elements. Control is achieved through several major subsections, shown as the elements in a second row of FIG. 10. (Note, for purposes of this application, the terms "microprocessor" and microcontroller" are synonyms.)

The first major subsection is a memory controller 2. The memory controller subsection 2 includes a read-only-memory (ROM) 21, which holds program memory; a static random access memory (SRAM) 22, which stores user, marketing and TV information and the viewing log; and a serial electrical erasable read only memory (EEROM) 23, which holds product purchasing history information and a token-to-vendor telephone number table.

A second subsection is a real time clock 3, which provides the time and date of user channel selection actions which are logged to the SRAM memory 22, and ultimately may be transferred to the vendor host computer for user/buyer profile information.

A third subsection of the RU 212 comprises a user interface 4. The user interface 4 includes a keyboard 43, a keyboard decoder 42, a Speaker or buzzer 45, an audio generator 44 which generates audio output for confirmation of keyboard operations and various alerting tones, and an LCD Display 41 that visually informs the user of options and status. Additionally, LED Display Indicators 46 also provide an alternate means for visually informing the user of options and status.

A fourth subsection is of the RU 212 is a TV communications interface 5. The TV communications interface 5 includes a microphone 51 which captures incoming DTMF tones enunciated by the enhanced commercials of interest; and an audio Amplifier and Filter 52 which enhances and isolates the DTMF tones from the ambient noise in the room. Also included within the TV communications subsection are an Infrared Command Controller 55 and an Infrared LED Emitter 54. The Infrared Command Controller 55 passes the TV command sequences to the Infrared LED Emitter 54 to control TV functions such as channel selection, channel up/down, volume up/down and power on/off, in conventional manner. Also included is an IR detector which detects IR signals generated by the TV (or a device attached to the TV) for receiving commands from the TV.

A fifth subsection of the RU 212 is a sales and marketing communications interface 6. This interface 6 includes a universal asynchronous serial interface (UART) and a modem 61, as well as a phone company interface circuit and RJ-11 Jack 62. The modem and UART 61 and phone company interface 62 advantageously allow the RU to: place calls to the vendor's order-taking host computer, usually maintained by the sales and marketing department, for a chosen product; transfer information to and from the user/buyer; and facilitate the sales function, either with or without interaction from a salesperson.

A sixth subsection in the RU 212 is a voltage regulation and power control circuit 7. This power control circuit 7 allows efficient operation and long-life of the RU 212 using, in the preferred embodiment, a pair of inexpensive AA batteries 72, and a back-up Lithium Battery 71.

Figures 1, 2A:
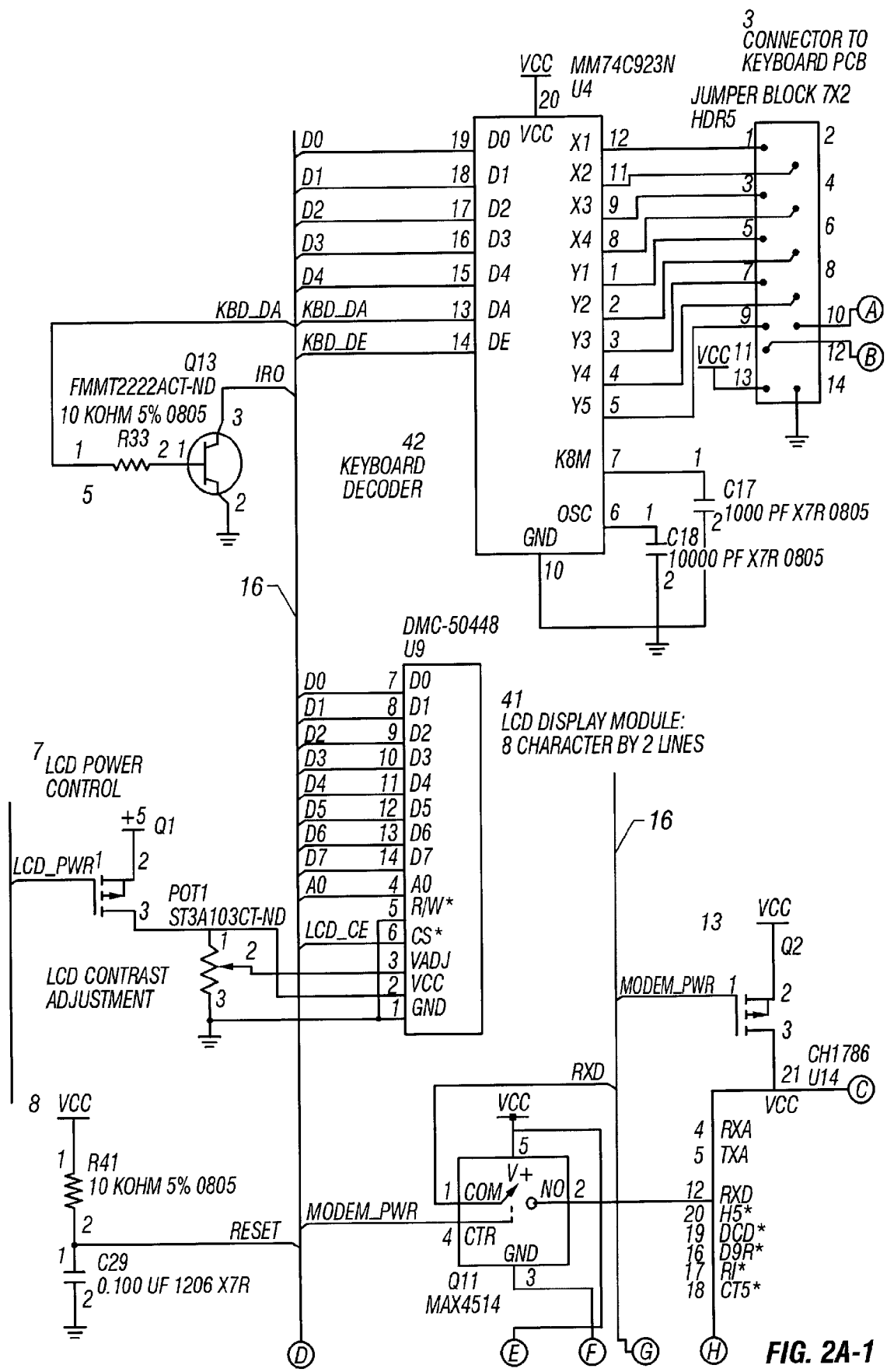
FIGS. 2A, 2B and 2C are schematic/logic diagrams of the various circuits used within a preferred embodiment of the Remote Unit (RU) used with the Broadcasting Marketing System (BMS)
Figures 2, 2A:
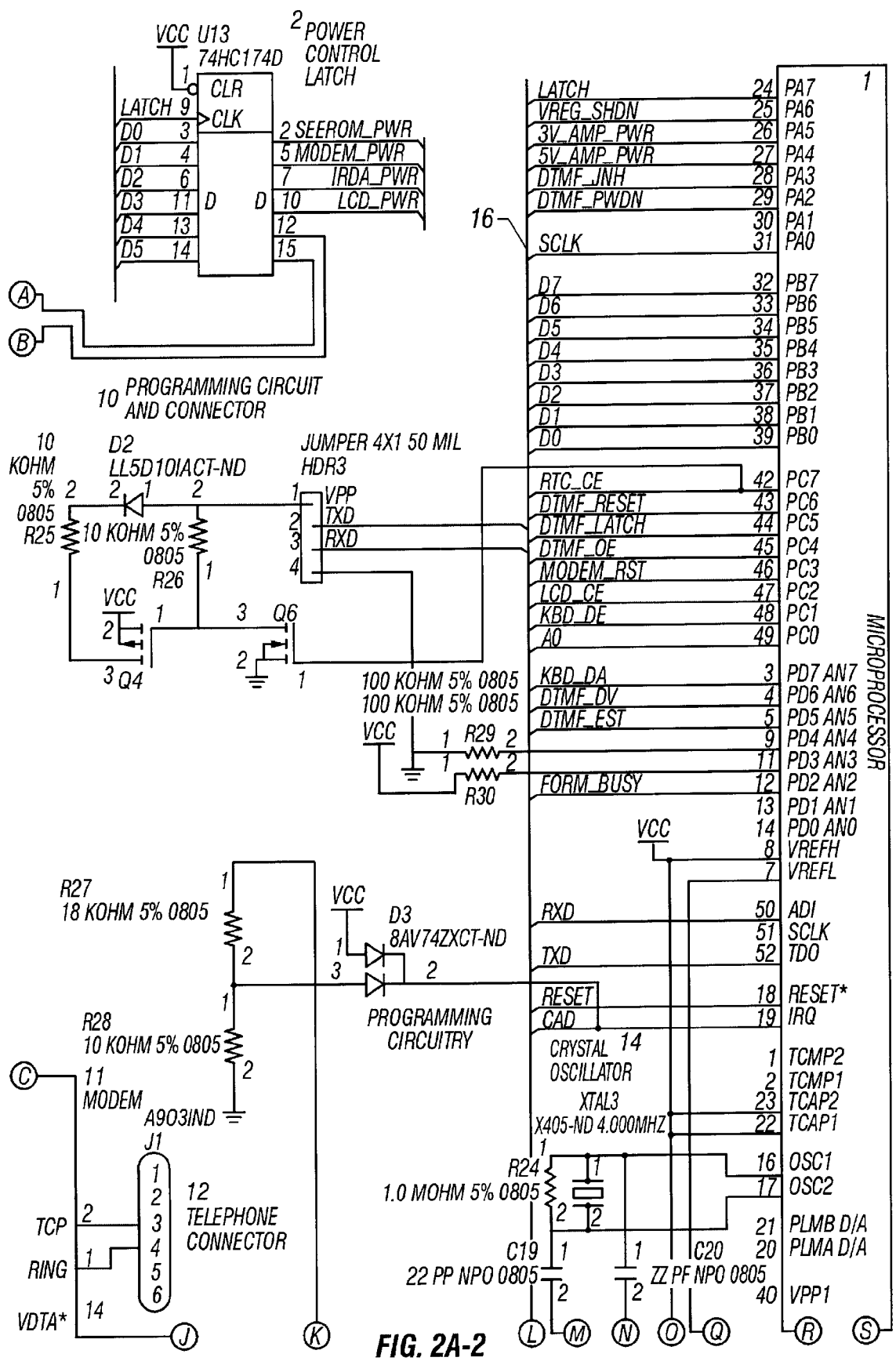

Given the above description of the BMS 10 and the RU 212, those of skill in the electronic arts should be able to design appropriate circuitry to carry out the functions of the invention. The schematic/logic diagrams of a preferred implementation of the Remote Unit 212 are illustrated in FIGS. 2A, 2B, and 2C. In these figures, FIGS. 2A, 2B and 2C, the reference numerals correspond to the same reference numerals used in the block diagram of the RU described previously in connection with FIG. 10. The diagrams of FIGS. 2A, 2B and 2C should be self-explanatory to those of skill in the art. Nonetheless, the following brief description of the elements shown in FIGS. 2A, 2B and 2C is presented.

The central element of the Remote Unit 212 is the microprocessor 1 which contains logical, arithmetic, command memory, data memory and memory control and timing functions, well known in the art. The microprocessor 1 is initially programmed via a programming circuit 10. The user communicates with the microprocessor 1 via the keyboard 43 and the Keyboard Decoder 42. The keystrokes are decoded by the Keyboard Decoder 42 which passes the keystroke pulses to the microprocessor 1, via the multiline bus 16. Power consumption is reduced by powering down most of the major components when they are not in use. Only the keyboard decoder and low power microprocessor 1 are active at all times. When the power on button is pressed the LCD Display 41 is powered on. Advantageously, these elements may be included in a highly integrated electronics package.

Various states or modes of operation associated with the BMS 10 of the present invention will next be described.

Figures 2, 2A, 3:
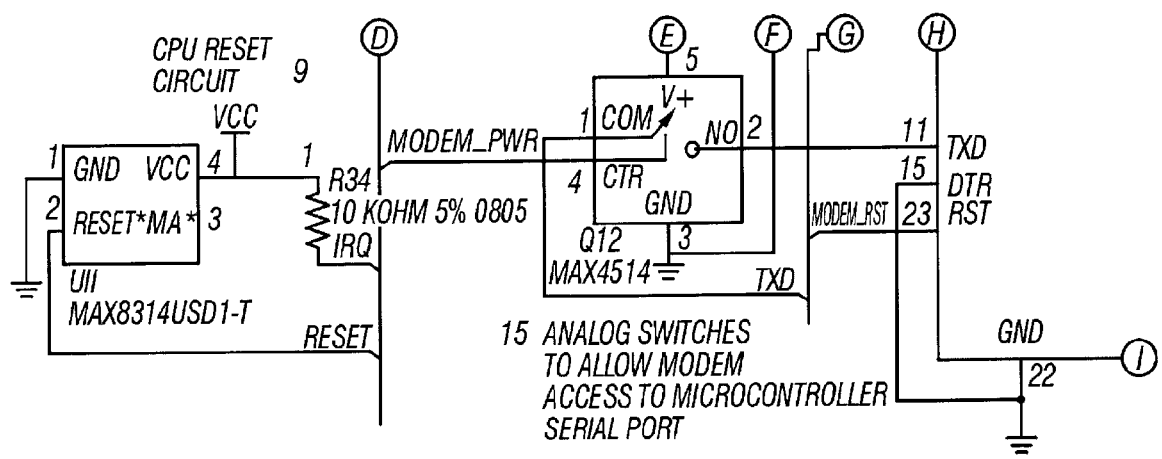
FIG. 3 is a flowchart that shows the TV and RU operation when the TV is not on, and when the RU is not being used.

FIG. 3 is flowchart that shows what occurs when the TV is not powered on, and the RU 212 is not being used. (In FIG. 3, as well as the other flowchart diagrams presented herewith, reference numerals are used to help identify the various functional blocks that are shown in these flowchart figures.) The normal state of the RU is operational, but in a low-power consumption mode. Thus, while in the low-power consumption mode, almost all functions of the device are powered off except for the microprocessor 1 and the keyboard decoder 42 (FIG. 2A). Note that the keyboard decoder 42 is also functionally represented in FIG. 3 as element 36. A Table Compare function (block 37) ignores keyboard input that includes numbers (block 33), Channel Up/Down (block 34), and Volume Up/Down (block 35). However, in the event the keyboard input comprises pressing the Power On/Off button (block 32), then the Table Compare function (37) initiates a Power On sequence (block 39) that sends an Infrared signal pattern to the TV's IR sensor that causes the TV to power on and automatically tune to the preprogrammed power-on channel. Then this power-on event is logged (block 392), as described more fully below in conjunction with FIG. 4.

In a similar manner, if the Select button (block 31) is pressed, then the Table Compare 37 initiates a Product Order Sequence (block 391), as detailed more fully below in conjunction with FIG. 7A. Then, this product-order event is logged (block 392) and the keyboard decoder awaits another key depression (block 36).

Figures 2, 2A, 3, 4:
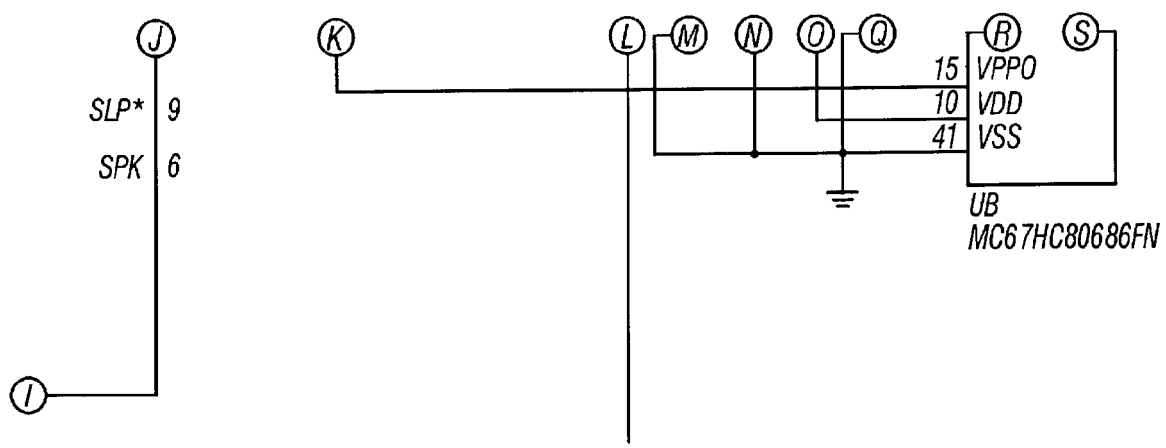
FIG. 4 is a flowchart that shows the TV and RU operation when the TV is to be powered on and operation of the RU is to commence.
Figures 1, 2B:
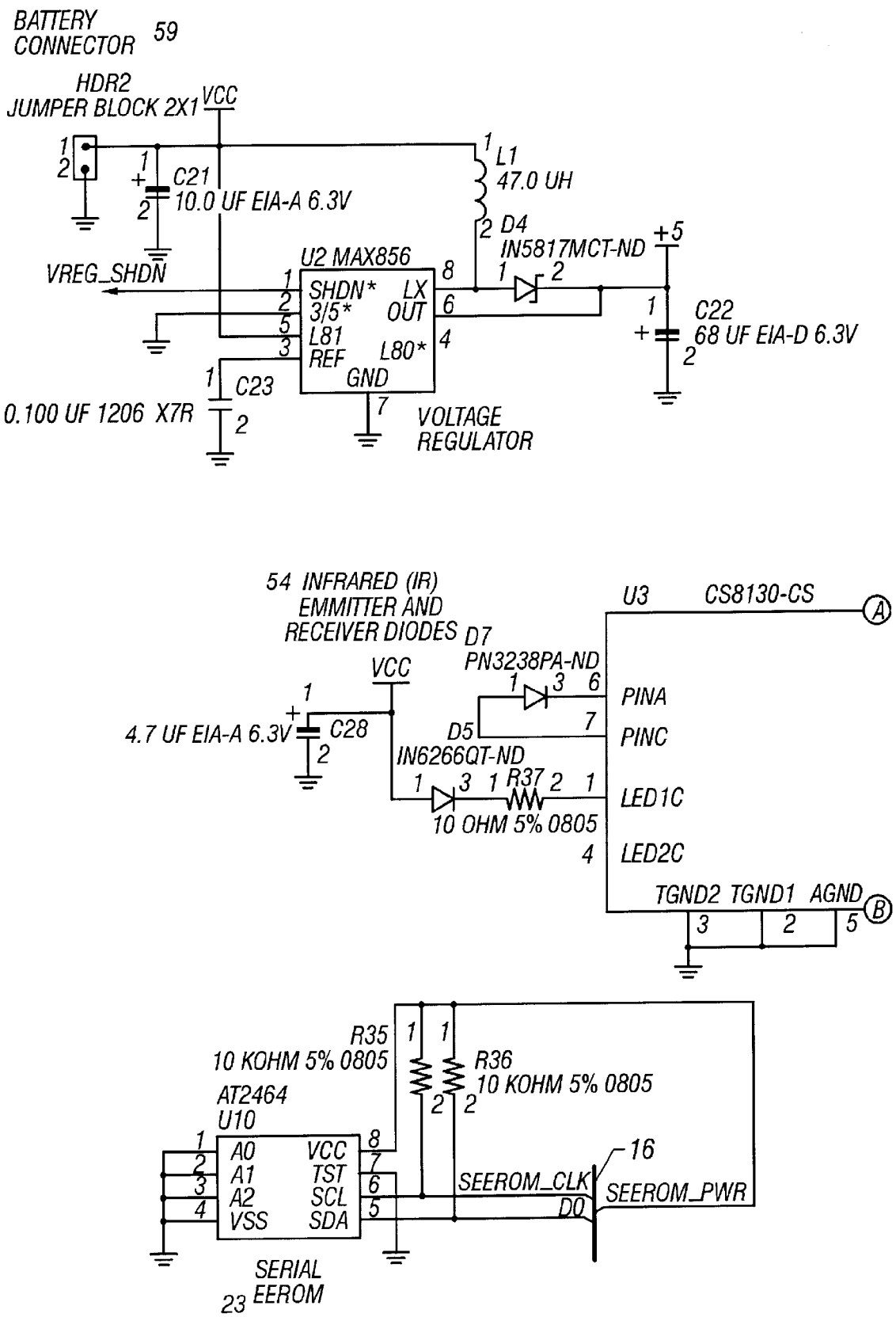
Figures 2, 2B:
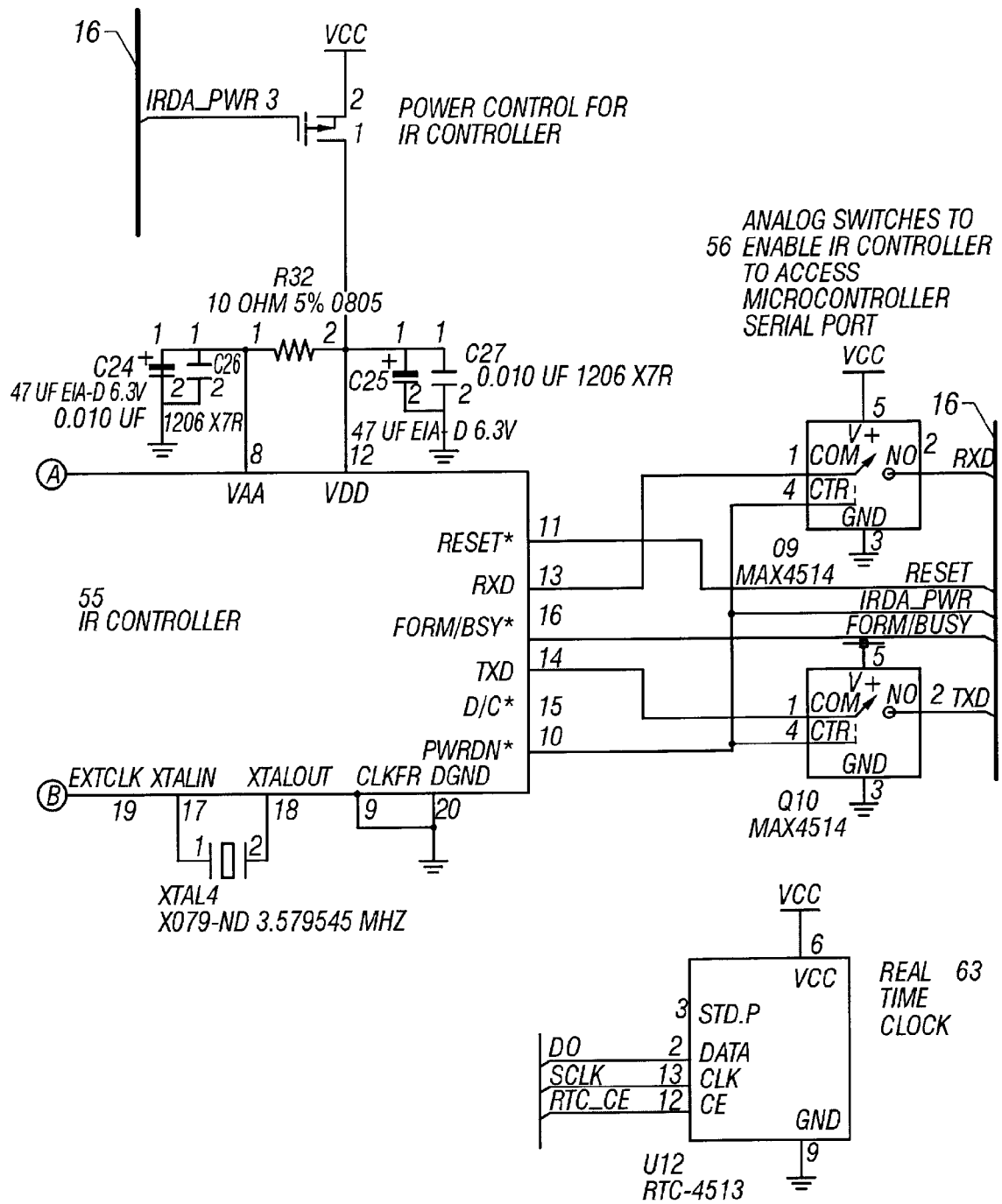
Figures 1, 2C:
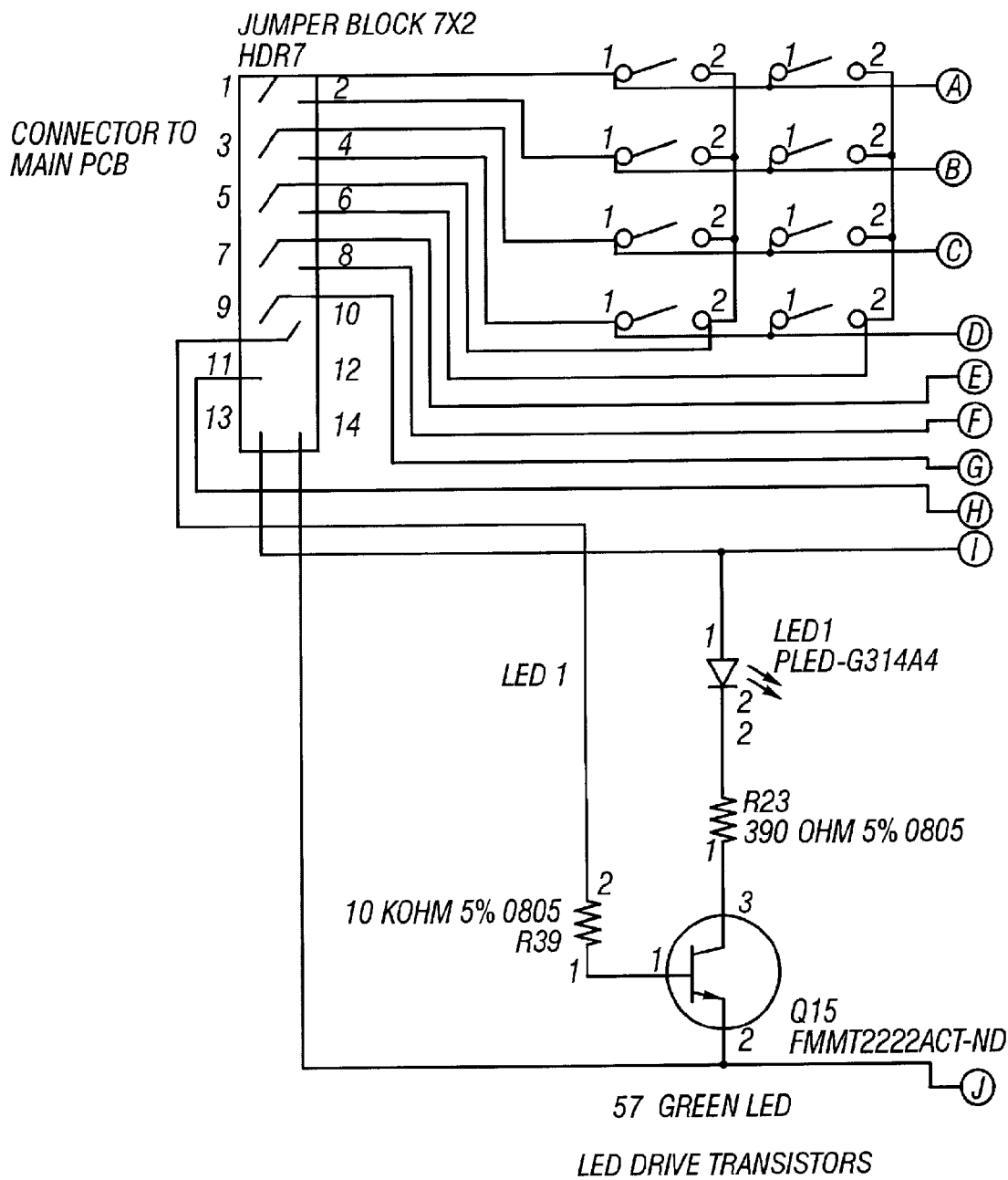
Figures 2, 2C:
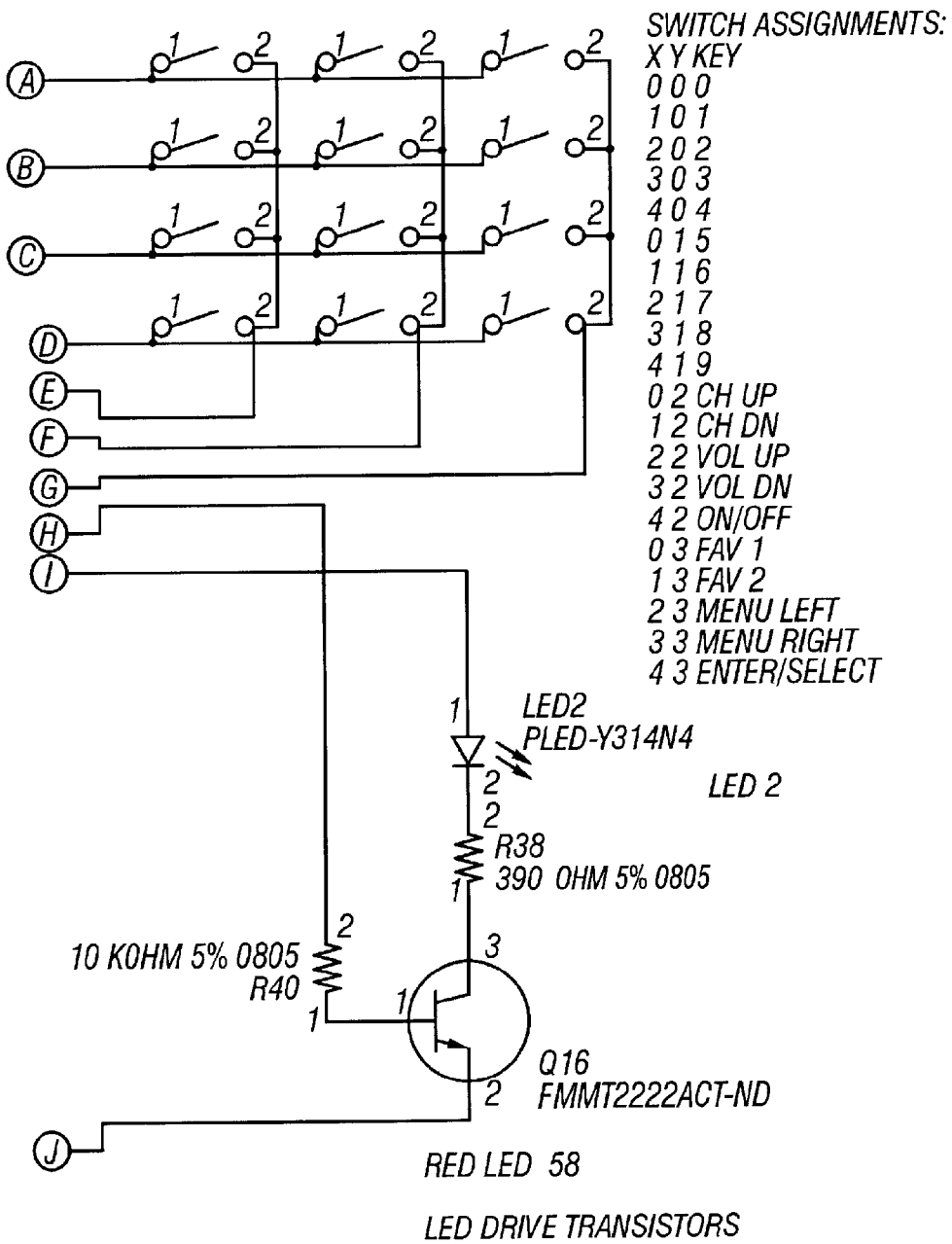
Figure 3:
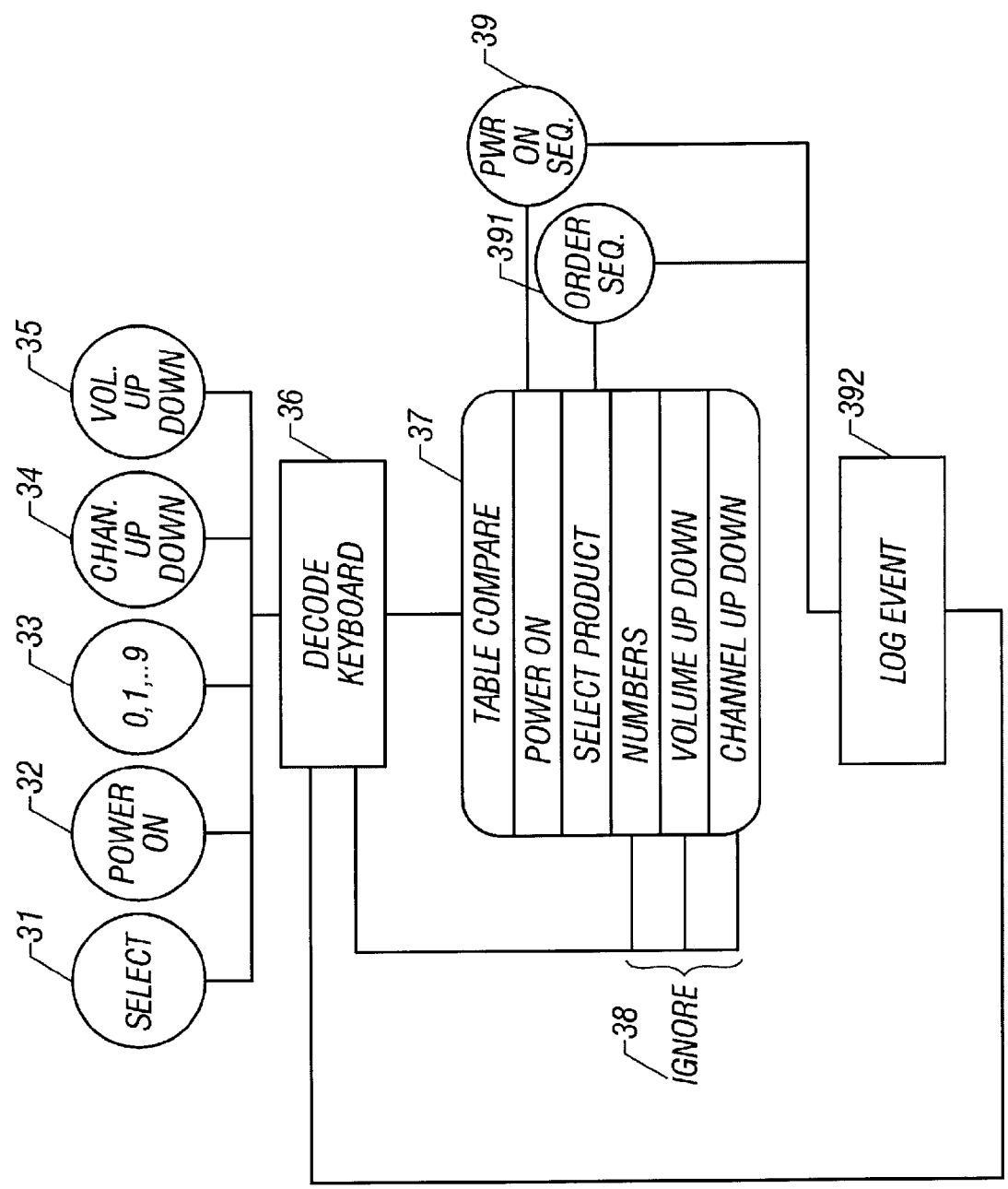
Figure 4:
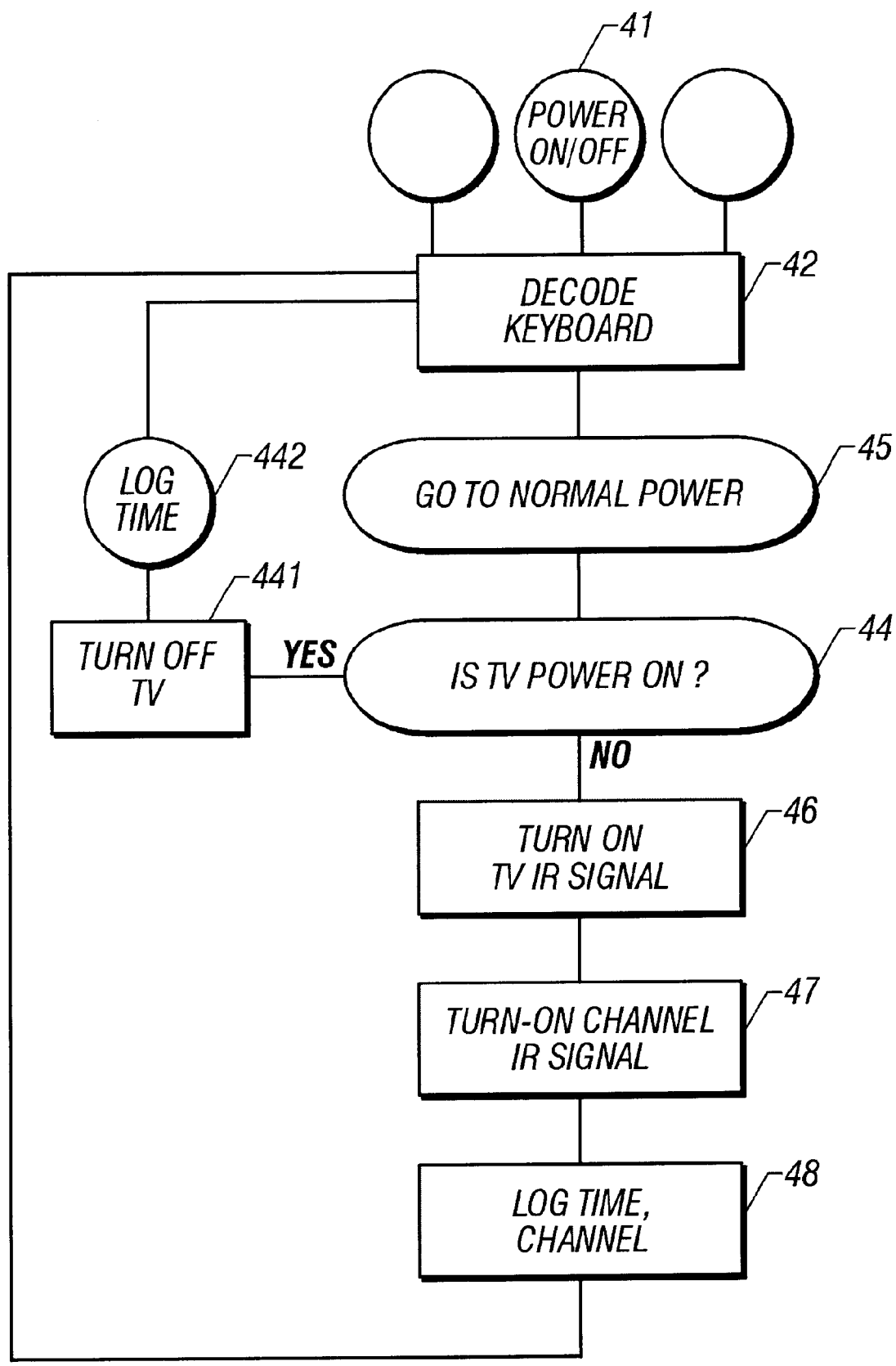

Turning next to FIG. 4, a flowchart is shown that illustrates the power on sequence used by the invention. As seen in FIG. 4, when the user wishes to turn on the TV, he/she first depresses the ON/OFF button (block 41, FIG. 4) located on the keypad of the RU 212. This action, decoded by the keyboard decoder (block 42), causes the microprocessor to: enter a normal operating state (block 45); apply power to the elements within the TV communications interface; test if the TV is already powered ON (block 44); if yes, turn the TV off (block 441) and time-log the event (block 442); if no, send the IR command signal to the TV that turns the TV power on (block 46), and select the RU provider's preselected turn-on channel (block 47). The power on time and channel are then logged (block 48).

In the manner described, it is thus seen that date and time logging of the power on and date/time are logged for each channel selection that is made which exceeds 10 seconds (or other preset time period, e.g., 30 seconds, 1 minute), The RU remains in this mode until a preset time-out occurs (see FIG. 5), upon which occurrence the RU will again power-down the TV Communications interface and LCD Display to conserve power. When coming out of this low power state, e.g., because one of the keys of the RU is pressed, the RU tests if the TV is still on and acts accordingly.

Figure 5:
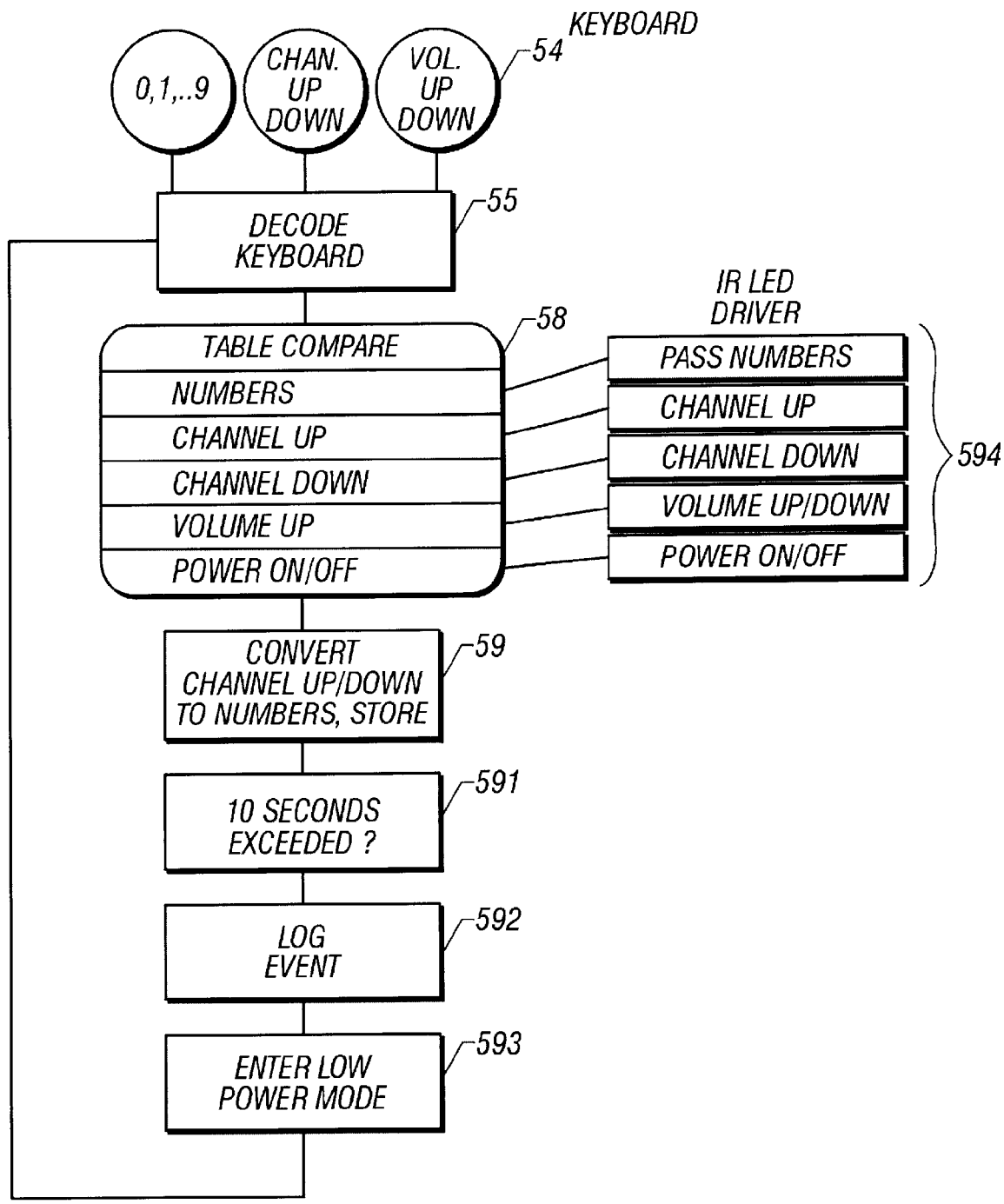

FIG. 5 is a flowchart that illustrates the manner in which the RU 212 selects channels, logs the event and returns to a low power state. As depicted in FIG. 5, the RU responds to any button request (blocks 55, 58) and displays and executes the selected TV remote function (block 594). If the action is a channel change (block 59), which could be either the result of pressing the Channel UP or Channel DOWN buttons (in which case the channel up/down is converted to a channel number) or directly selecting a channel number, and if a preset time limit (e.g., 10 seconds) times out (block 592), then the change is logged in the data memory along with the date and time (block 592). Then, the RU returns to its low power state and awaits the next depression of a key on the unit's keyboard.

Figure 6:
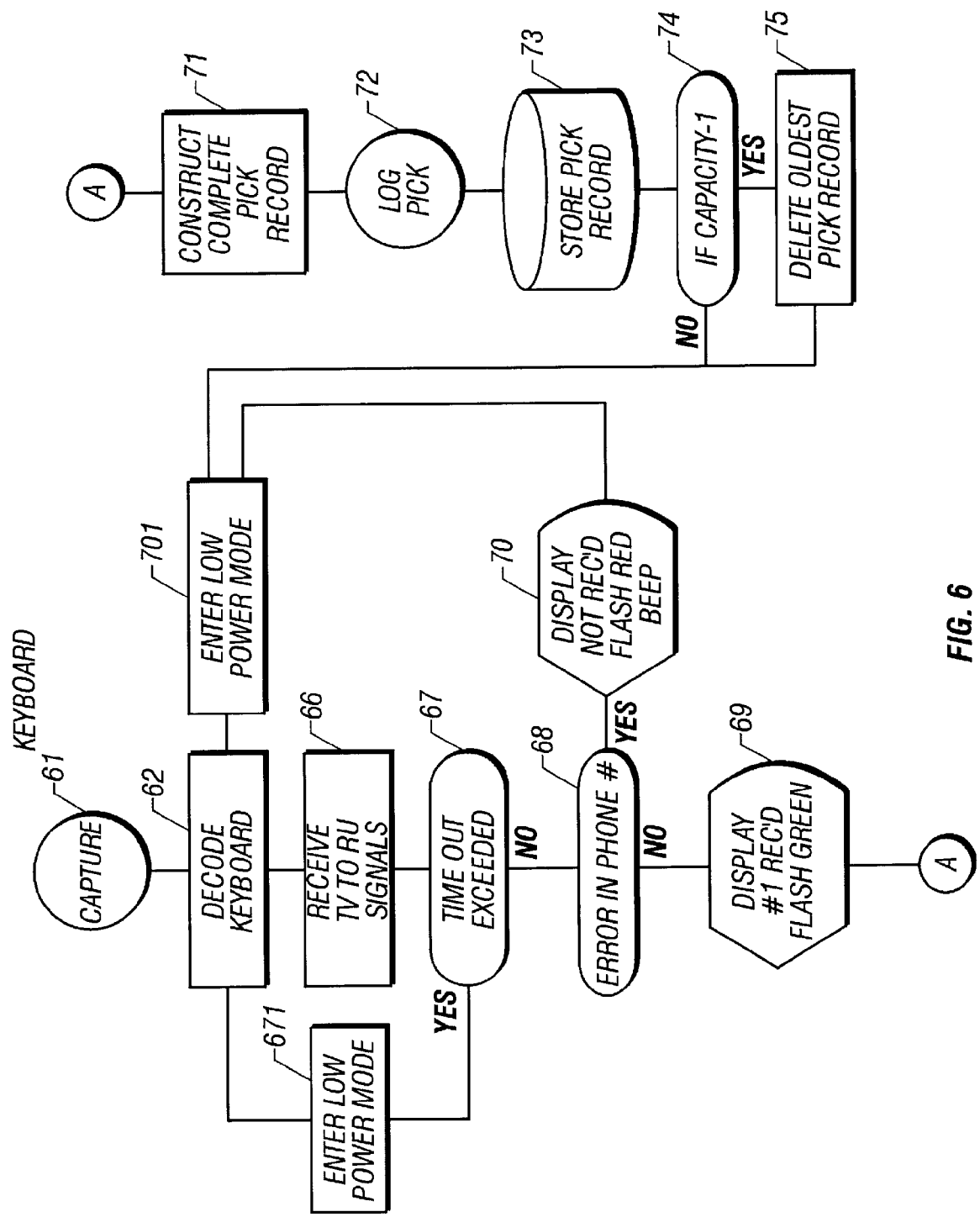
FIG. 6 is a flowchart that shows the TV on when the user selects a product of interest using the RU.

Turning now to FIG. 6, there is shown a flowchart that illustrates operation of the RU when the TV is on and when the user selects a product of interest. As seen from FIG. 6, the user alerts the RU 212 that he/she wants to select a product by pressing the Pick (or capture) button (block 61). This signal is then detected by the keyboard decoder and decoded (block 62). If no key is pressed, then the keyboard decoder just waits until a key is pressed. If a key is pressed, and the key is the Pick (or capture) key, then the RU receives the TV-to-RU DTMF signals (block 66). This is accomplished by enabling the microphone, audio amplifier and filter and the DTMF circuitry that form part of the TV Communications interface. A test is then performed to see if a complete or acceptable DTMF Pick Record sequence has been received by the RU from the TV. One type of acceptability test that may accomplish this goal is to test for receipt of a complete phone number (block 68). If, after performing the Pick Record received test, a determination is made that the DTMF code has been received without an error, then a message is displayed on the LCD Display that a successful capture has occurred. Such message may comprise a simple statement that a first Pick Record has been received, e.g., "#1 REC'D". Alternatively, or conjunctively, visual confirmation may be made by flashing the Green LED (block 69).

Should capture not be successful, the RU 212 beeps, and a Red LED is flashed, and/or a simple message is displayed that informs the user the Pick Record was not received, such as "NOT REC'D" (block 70), thereby informing the user to try for a later capture.

The most critical item in the DTMF Pick Record is the fulfillment-computer's phone number or phone number token (a phone number token is, effectively, an abbreviated phone number or code, similar to a speed dialing number). If the phone number or token is received, then the RU does not notify the user of an error (block 68). This is because the phone number or token, when received, allows a phone connection to be made with the order-taking computer. Once such connection is made, a sales clerk at the Vendor's order-taking site can prompt the user for any other missing data associated with the order.

Ambient noise or poor signal levels or quality can limit the ability of the RU device to correctly receive the DTMF data. In a preferred embodiment, the actual data capture comprises at least one of the following groups. A first group that includes: (1) a 2-digit phone number token to call to order the product, (2) the 4 or 6 digit product ID or SKU code, (3) a check (parity) code, (4) the 4 character (8 DTMF tones) call sign of the TV station, and (5) an identical 2-digit phone number token, in reverse order, used as a check code. Or, a second group that includes: (1) an asterisk followed by a 10-digit phone number to call to order the product, (2) a check code, (3) the 4 or 6 digit product ID or SKU code, (4) the 4 character call sign of the TV station, (5) a second identical phone number in reverse order, used as a check code.

Once received by the RU, the microprocessor examines the code and constructs the most accurate DTMF pick record possible (block 71, FIG. 6). The pick record is then logged (block 72). This logged pick record is next stored in memory for later ordering use (block 73). A number of DTMF Pick record sequences may be stored in the RU memory (block 73) before an order is placed. Should the memory capacity be exceeded (block 74), then the oldest DTMF pick record is deleted (block 75). In this manner, the RU memory functions as a first-in first-out (FIFO) memory element.

Still referring to FIG. 6, it is seen that when the capture is complete (blocks 71–75) and/or a time out occurs (block 67), the device returns to a low power mode (blocks 671, 701).

Figure 7A:
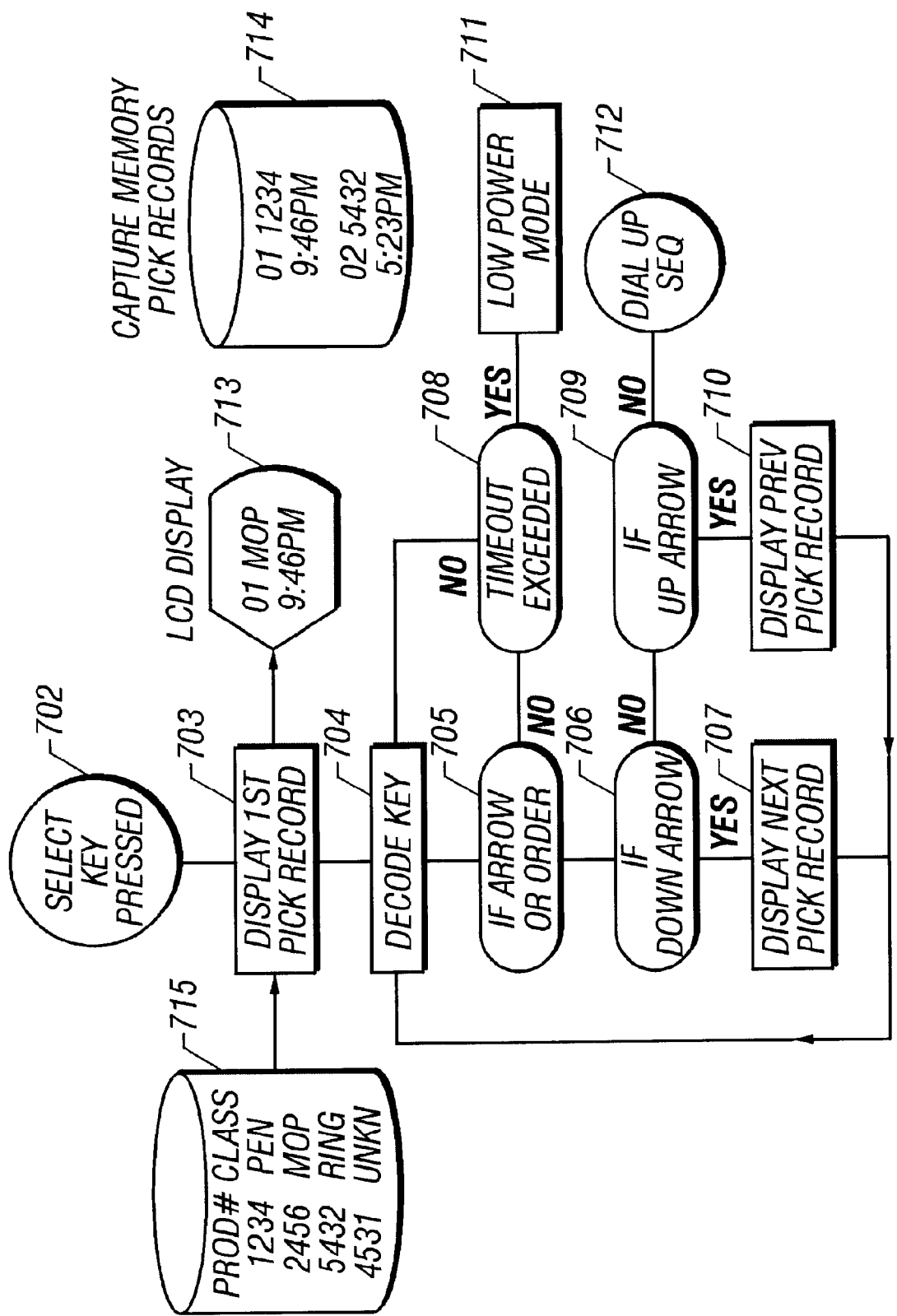
FIG. 7A is a flowchart that shows operation of the system when an order is selected and placed.
Figure 7B:
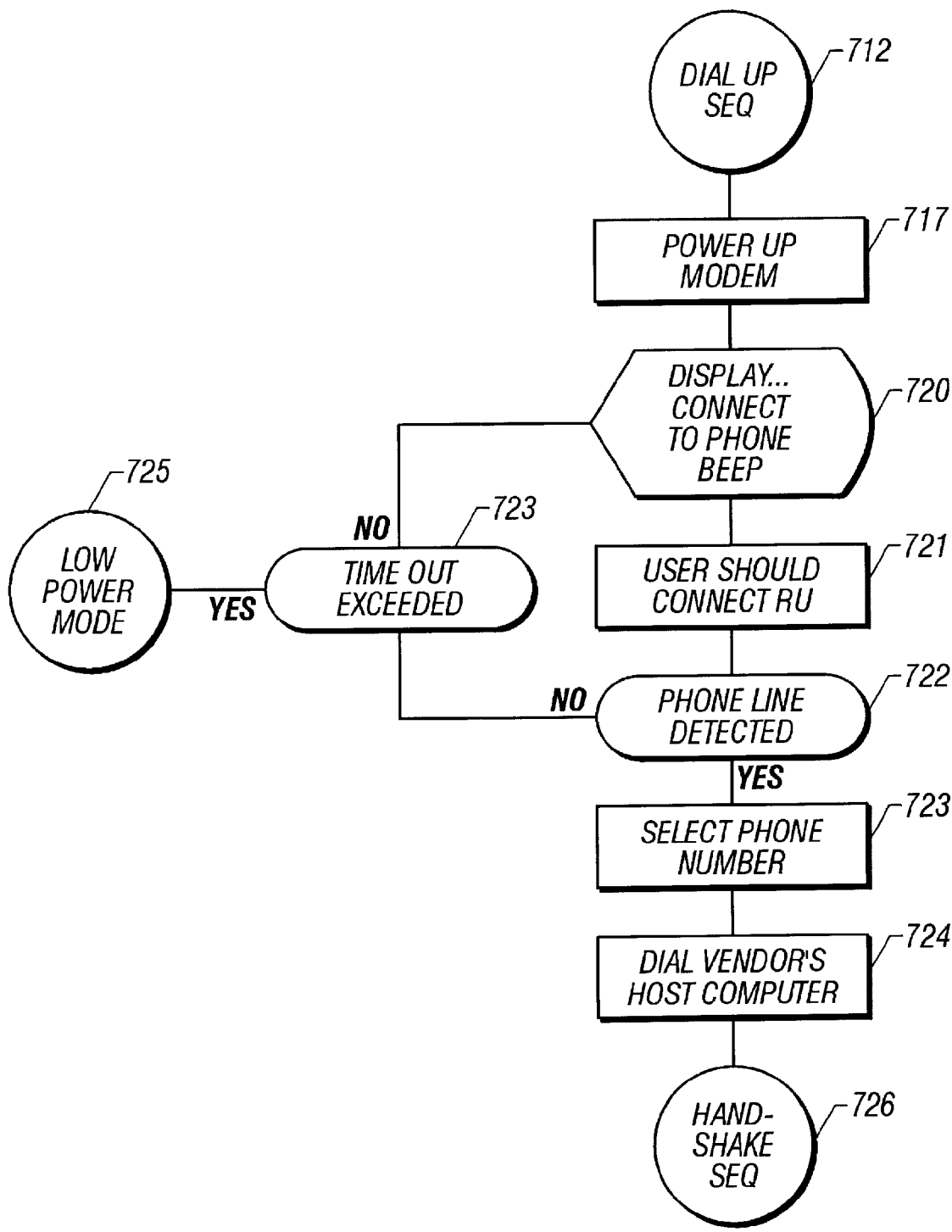
FIG. 7B shows a flowchart of the dial-up sequence used by the RU to connect with an order-taking computer via a telephone line.

Next, with reference to FIG. 7A, there is shown a flowchart that depicts the manner in which a user selects those products that he/she wants to order from the Pick Records that have been been captured and stored. During this process, the TV may be on or off. To place an order, the user depresses the Select Key on the keypad of the Remote Unit (block 702). When the Select key is first depressed, no Pick Records are displayed. However, the first depression of the Select key causes the LCD Display on the Remote Unit to display to the user the most recent Pick Record that has been captured (blocks 703, 713). However, even though only the most recent Pick Record is displayed (because the display on the Remote Unit is typically only a one or two line display, or at least a limited display), all of the captured Pick Records are stored in the memory of the Remote Unit (blocks 714, 715). For each Pick Record displayed, the display shows the index number, a generic description of the product, and the date and time recorded, e.g. The user can scroll up or down in order to view all of the stored Pick Records, using arrow buttons "↑↓" located on the keypad of the Remote Unit. Typically, this is done as follows: The user presses a key. If it is not an arrow key or Select key (block 705), then the RU will process other keys (block 708). If it is an arrow key or Select Key, the RU tests for the DOWN arrow (block 706). If a DOWN arrow, then the next Pick Record stored in the RU memory is displayed (block 707). If not a DOWN arrow, then the RU tests for the UP arrow (block 709). If it is an UP arrow, then the previous Pick Record stored in the RU memory is displayed (block 710). If not an UP arrow, then that means it must be the Select key, so the Dial Up Sequence is started (block 712) because this is the second depression of the Select key, and it was made when the desired product was displayed on the LCD Display. The Dial-Up Sequence is shown in FIG. 7B. If the key that is depressed is not either the Select key or one of the DOWN/UP arrow keys (NO branch of block 705), then whatever other key was depressed is processed (block 704), unless a timeout occurs, in which case the RU returns to a Low Power Mode (block 711).

As seen in FIG. 7B, the Dial-Up sequence begins (block 712) by first applying power to the modem (block 717) that is included as part of the circuitry within the Remote Unit. Next, the RU informs the user to connect the phone line to RU by displaying an appropriate message and beeping (block 720). The user then connects the RU to the phone line by either attaching a phone line cord to the RJ-11 jack that is built into the RU, or by placing the RU in a cradle that is already connected to the phone line (block 721). The RU then waits until the user connects the phone line and the phone line is detected (block 722) or times out (block 723) and goes back into its low power state (block 725). The RU samples the modem status to detect when the phone line is attached. Upon verification of connection to the phone line, the RU selects the appropriate vendor's host order-taking computer telephone number (block 723) that is associated with the selected Pick Record, and then dials the number (block 724). Once a telephone connection is established with the host computer, a handshake sequence begins (block 726), which is detailed more fully below in conjunction with FIG. 7C.

Figure 7C:
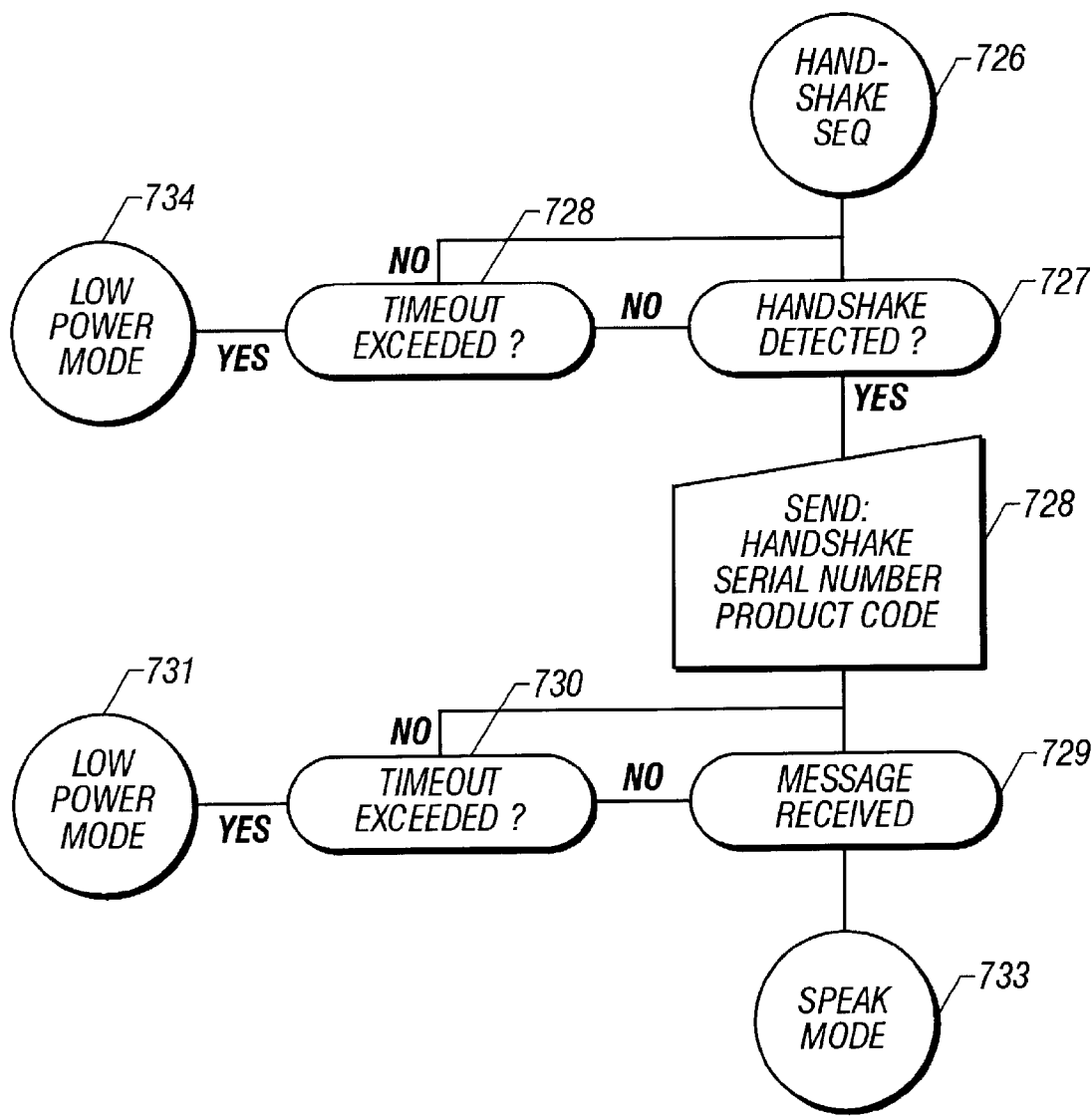
FIG. 7C shows a flowchart of the handshake sequence used between the RU and the order-taking computer in order to establish a valid connection between the two.

FIG. 7C is a flowchart of the handshake sequence that is used between the RU and the order-taking host computer in order to confirm that a proper telephonic link has been established suitable for data. transmission. Once the RU makes contact with the vendor's order-taking host computer, the handshake sequence begins (block 726). In a preferred handshake sequence, the host computer, once it receives a call from the RU, sends a handshake signal back to the RU. The RU waits for this handshake signal (block 727), and once received, responds thereto by transferring to the host computer the RU serial number and product code (block 728). If no handshake signal is received (NO branch of block 727) for a prescribed timeout period (block 728), then the RU returns to its low power mode (block 734). In response to receipt of the RU serial number and product code, the host computer may determine that more information is needed. If more information is needed, it sends a message (i.e., a signal) to the RU requesting that it begin the "speak mode", thereby allowing the user to speak directly with an individual at the host computer site so that the needed information can be obtained. The preferred speak mode sequence is explained below in connection with FIG. 7D. If no speak mode request signal is received (NO branch of block 729) for a prescribed timeout period (block 730), then the RU returns to its low power mode (block 731). If a speak mode request signal is received (block 729), then the speak mode begins (block 733).

Figure 7D:
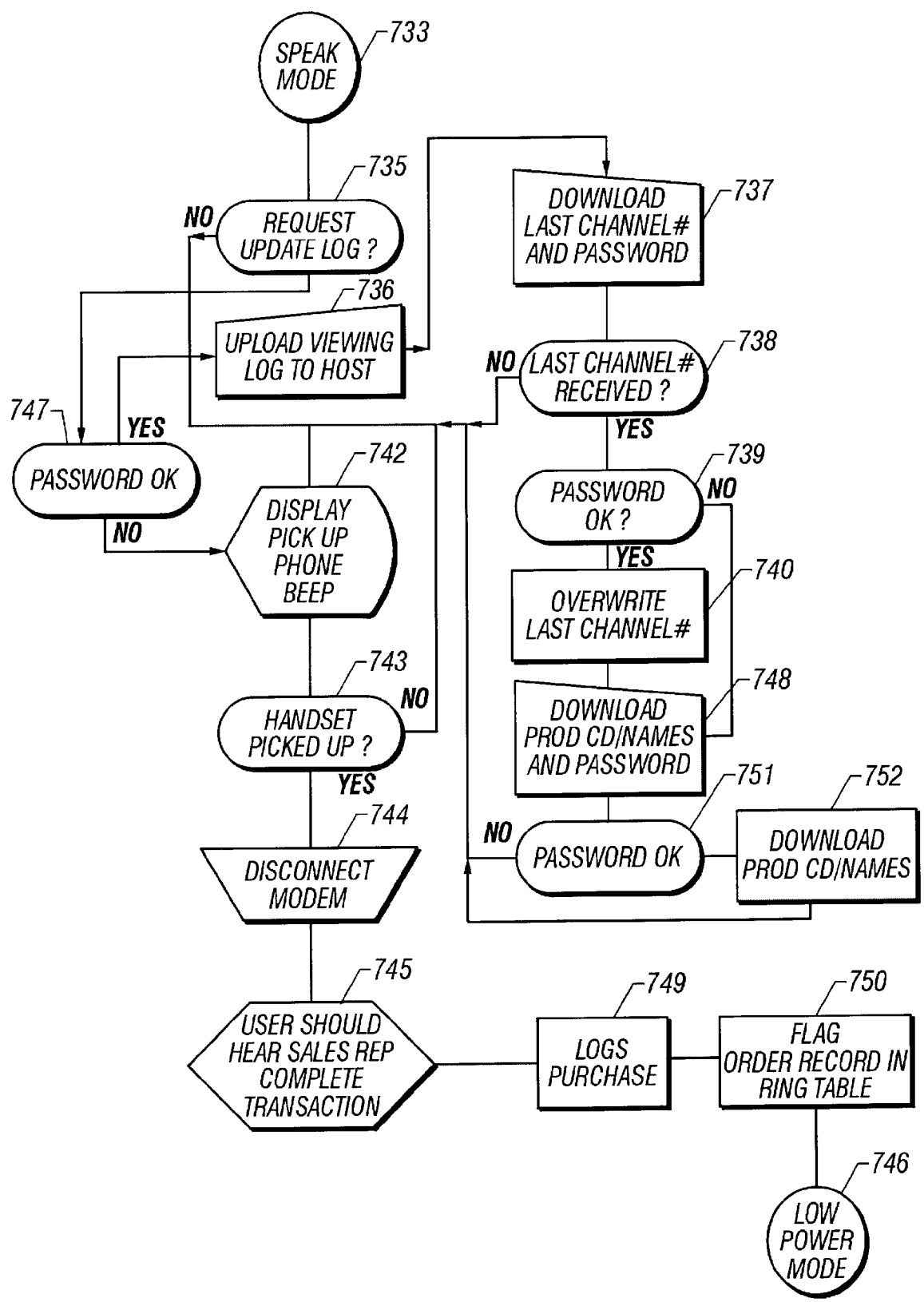
FIG. 7D shows a flowchart of a speak mode that may optionally be used with the BMS.

The speak mode (block 733) is detailed in the flowchart of FIG. 7D. As it begins, the Host computer may send an Upload Log Request (block 735). Such a request may be made where there is digital information that needs to be exchanged between the RU and Host before any voice communication occurs. For example, an Upload Request is typically made by having the Host computer send a pre-approved or pre-assigned password. If the password is OK (block 747), then RU uploads the user's TV Viewing Log to the Host computer (block 736). Next, the Host may download to the RU a Vendor's Channel Number and an accompanying password for activation as a preferred channel button (block 737). If the RU detects the Channel number (block 738), the RU tests the password that accompanied the channel number (block 739). If the password is OK (YES branch of block 739), then the channel number button value stored in the RU memory is overwritten (block 740). Next, the host requests to download product code names and sends a password (block 748). If the password checks out (block 751), then the product code names are downloaded (block 752).

If any of the passwords do not check out (e.g., at blocks 747 or 751), or if any of the data is not received as anticipated (blocks 735 or 738), and/or if all the product code names have been downloaded (block 752), then the system reverts to its voice feature by having the LCD display on the RU display the message "PICK UP PHONE" and by beeping(block 742). The RU then waits until the handset of the phone is picked up (block 743). If the user picks up the phone, the RU disconnects the modem (block 744). The user should then hear a sales representative on the other end of the line, and the sales transaction can be made, completed, or verified in conventional manner (block 745). The RU then logs the purchase (block 749), and the order record is flagged as completed in the RU's Ring Table (block 750). (The Ring Table is that portion of the RU's memory where the product codes of captured Pick Records are stored in a FIFO memory.) Then the RU goes into its low power mode (block 746).

Figure 8A:
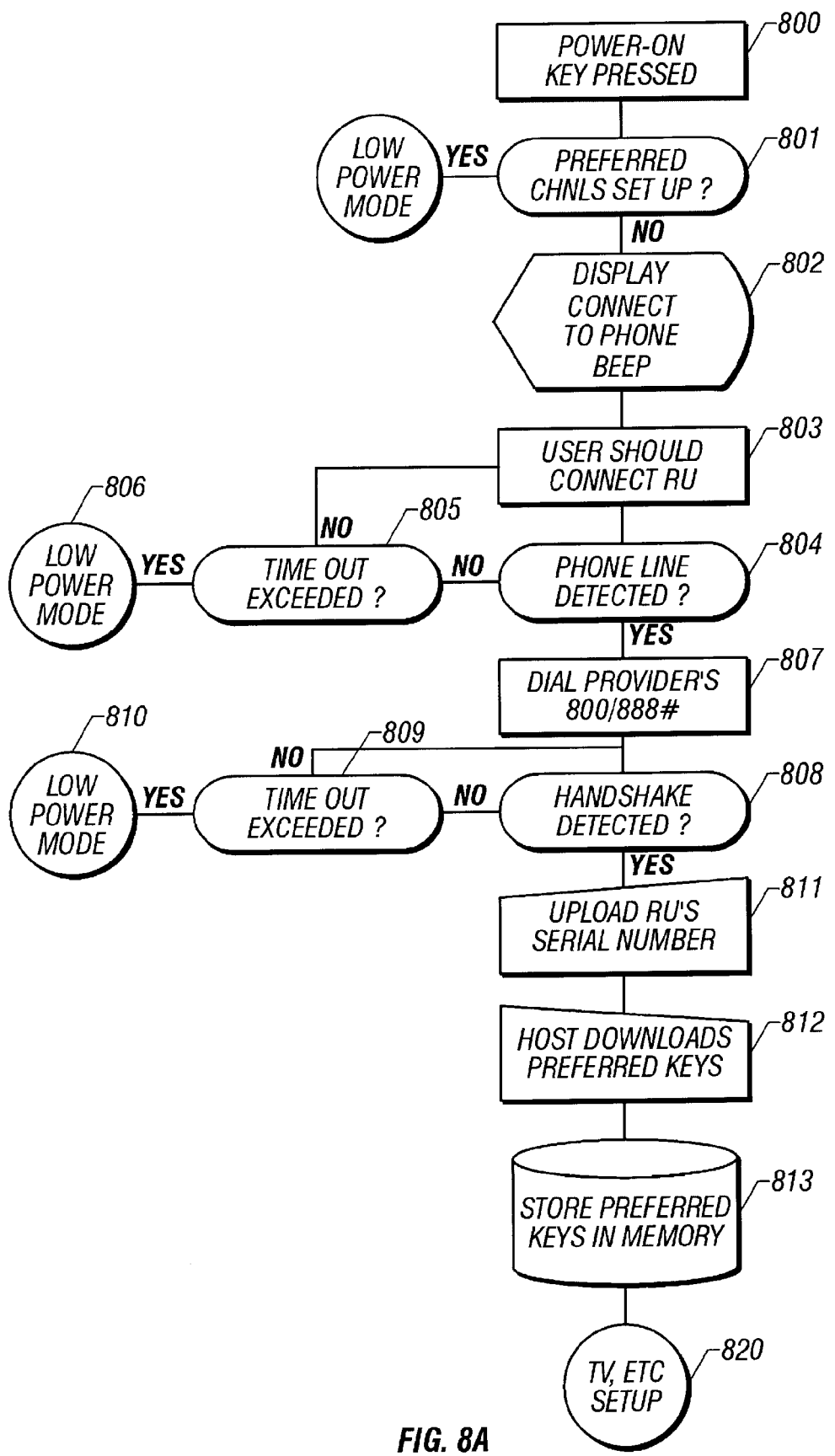
FIG. 8A shows a flowchart of the manner used to program Preferred Channels within the RU.

Next, with reference to FIG. 8A, a flowchart of the operation of the RU relative to selecting the preferred channel is illustrated. The RU has four keys that cause the RU to signal the TV to tune to four preferred channels. Depending upon the area of residence, the preferred channels will have different numbers. It will be necessary to either preset the RU with the preferred numbers before shipping the RU to the user, or have the user call the Provider's Host computer and have the numbers downloaded. In most cases it may be preferable to have the user call the Host computer and receive what may be the newest preferred channels. This will also confirm that the user has received the RU.

When the user first receives the Broadcasting Marketing System Remote Unit (RU), e.g., through the mail or other shipment or purchase, he/she will be induced via a premium offer to connect the RU to the phone jack in order to have the RU dial the 800 or 888 phone number of the Provider's Host computer in order to program the RU to activate the TV, VCR and/or cable box. The user will be instructed to install the batteries in the RU and press the TV power-on key (block 800). The RU will self test to ascertain if the preferred keys are assigned in memory (block 801). If not, the LCD Display prompts the user to "CONNECT TO PHONE" and beeps (block 802). The User then connects the RU to a phone line (block 803). When the phone line is detected by the RU (block 804), the RU dials the Provider's Host Computer 800/888 telephone number (block 807). The RU then waits until a handshake signal is detected (block 808) or a time-out occurs (block 809). If the handshake signal is detected, the RU uploads it's built-in serial number to the Host computer (block 811). The Provider's Host computer also receives the phone number of the user from the telephone company, as is standard when calls are received through an 800/888 number. The RU will not function as a normal TV remote if the preferred channels are not set up properly.

With a table of area codes and telephone prefixes, the Provider's Host computer is able to select with high accuracy the location and cable provider of the user. The Provider's Host computer will also have programmed therein the Power-On channel and the Preferred channel numbers for the area where the user is located. These and the current date and time are then downloaded to the RU (block 812), and stored in the appropriate memory addresses (block 813).

Figure 8B:
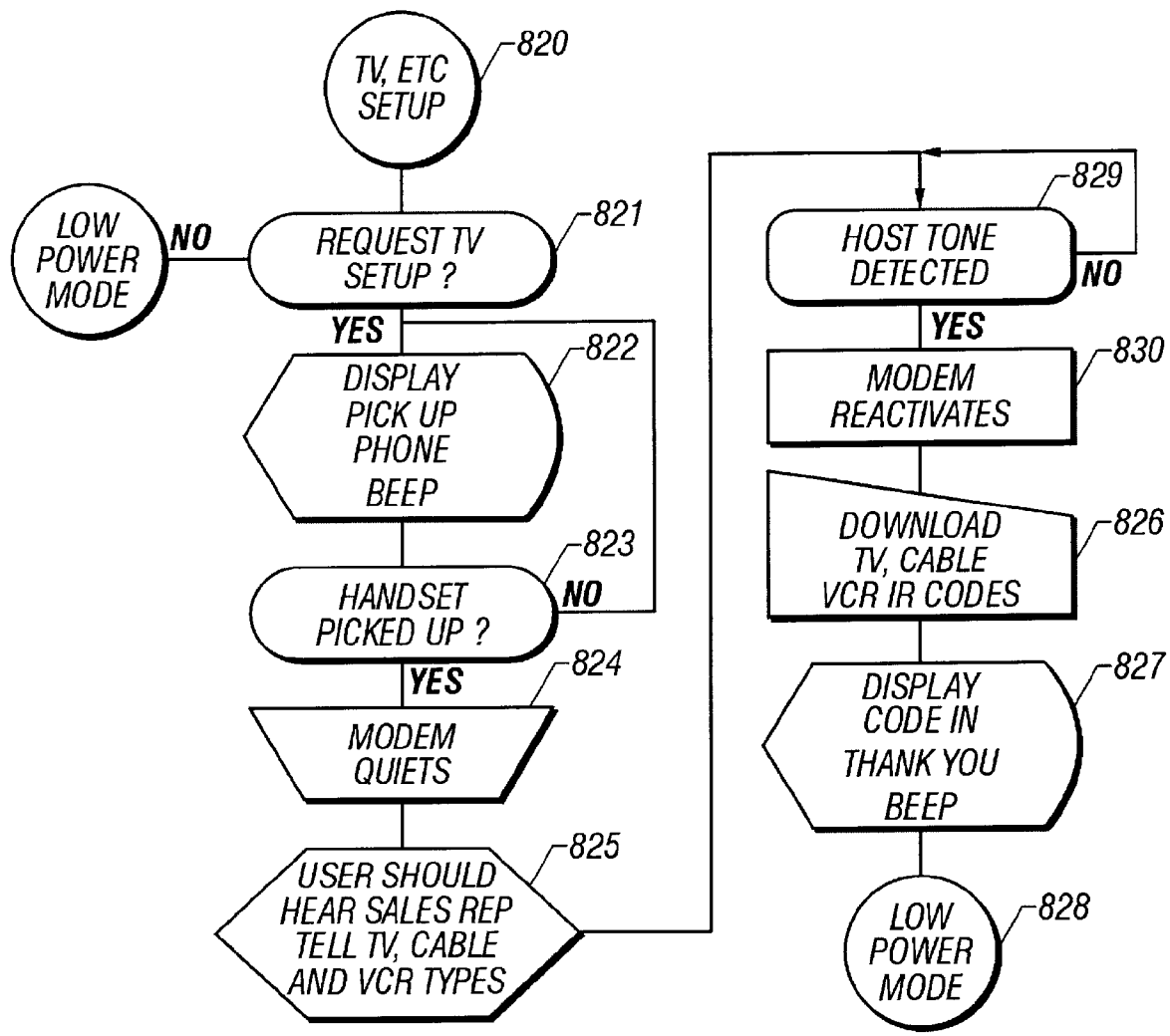
FIG. 8B shows a flowchart of the process used to download TV, Cable and VCR codes.

Next, with the Host-selected power-on and preferred channels selected and stored within the RU, the setup of the TV and related equipment (Cable, VCR, etc.) may continue (block 820), as shown in FIG. 8B. If a TV Setup Request is detected (block 821), the Host Computer prompts the User to pick up the phone by displaying "PICK UP PHONE" and by beeping (block 822). The RU then waits until it senses that the phone has been picked up (block 823). As soon as the user picks up the phone, the RU disconnects the modem (block 824). The user may then talk directly with a sales representative at the Host computer site, and the user can provide the sales representative with the TV, cable and VCR make and model numbers (block 825). The sales clerk then inputs to the Host computer this information. Once the information has been received, the Host generates a Host tone (block 829), signals the RU to turn the modem back on (block 830). Once the modem is back on, the Host computer downloads the appropriate TV, cable and VCR codes for storage within the RU (block 826). These codes are used in order to allow the RU to act like a conventional remote control unit in turning the TV, VCR, Cable Box, etc., On, Off, adjust the volume, station selection, etc. The RU LCD then displays the following message: "CODES IN. THANK YOU" and beeps (block 827), thereby confirming that the codes were received and that the TV setup is complete. Then the RU goes into its low power mode (block 828).

It should be noted that alternative methods may also be used to allow the user to input the TV, VCR, etc. model numbers, etc., to the Host computer without having to interface with a live sales representative. For example, a list of the most popular model numbers may be provided with the RU when shipped to the user, along with a digital code, which the user can then input to the Host computer using the touch tone pad on his/her phone, or other appropriate keys on the keypad of the RU.

Whatever technique is used, it is important that the user provide the Host Computer with the make and model of the TV and the VCR. The appropriate activation codes may then be downloaded to the RU. The RU will not accept downloading without the appropriate code. The code will vary depending upon the date and serial number of the RU.

In operation, when the user presses the POWER button of the RU, the RU will send the IR codes to the TV to power it on and switch to the turn-on channel. If the user has a cable or satellite set top box that controls the TV channel selection then the RU will be programmed to select the right channels via the set top box.

The RU also has four preferred channel buttons that are programmed when the user connects to the Provider's Host Computer. Typically, the user will be provided with stickers to identify the assigned buttons. From time to time, the Provider may reprogram the preferred buttons and the power-on channel. As explained above, this may be accomplished via the Vendor's Host Computer, subject to negotiation. The reprogramming can only be accomplished if the Host computer issues the correct password that has been released by the Provider. The password changes from hour to hour, day to day, or week to week, thus it is important that the RU be initially set up with the correct date and time. The password approval algorithm is hard-wired in the ROM of the RU.

The database that contains the TV, VCR and cable equipment usage will become a valuable asset.

Figure 9A:
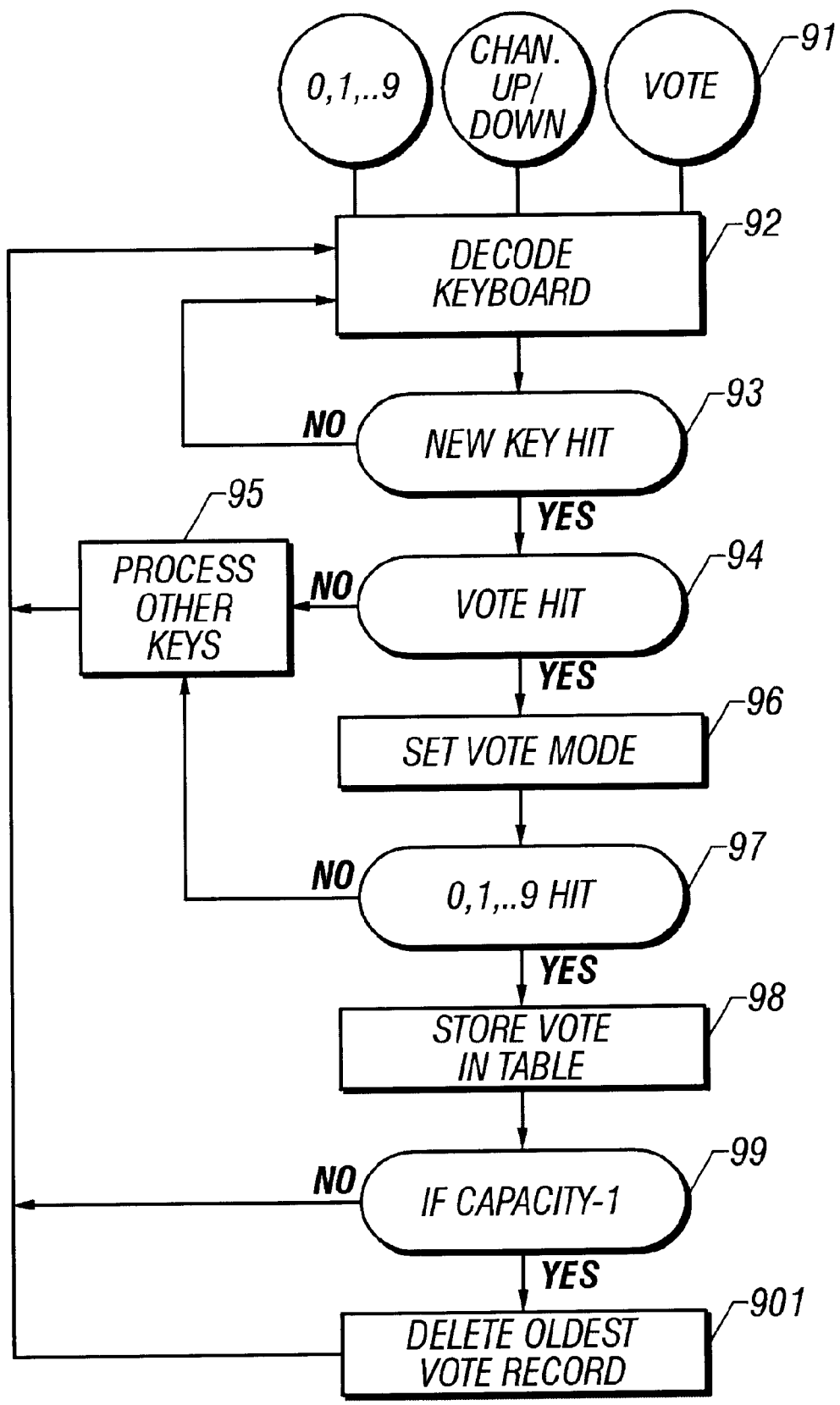
FIG. 9A and 9B show flowcharts of a store and forward Voting/Survey method that may be used with the BMS.

Turning next to FIG. 9A, a flowchart is shown that illustrates a store and forward Voting/survey Method that is available for use with the BMS invention. In accordance with such method, the user may store a vote (block 91) or opinion for later pick up by a polling organization's Host computer. Each time the user wishes to vote, he/she presses the Vote Key (block 94), thereby setting the vote mode (block 96), and then presses a number 0 to 9 (block 97), representing his/her vote selection. The RU stores the number in a vote table (block 98) along with the number of entries (blocks 98, 99, 901). The user can then connect the RU to the phone line. The RU goes to low power mode.

Figure 9B:
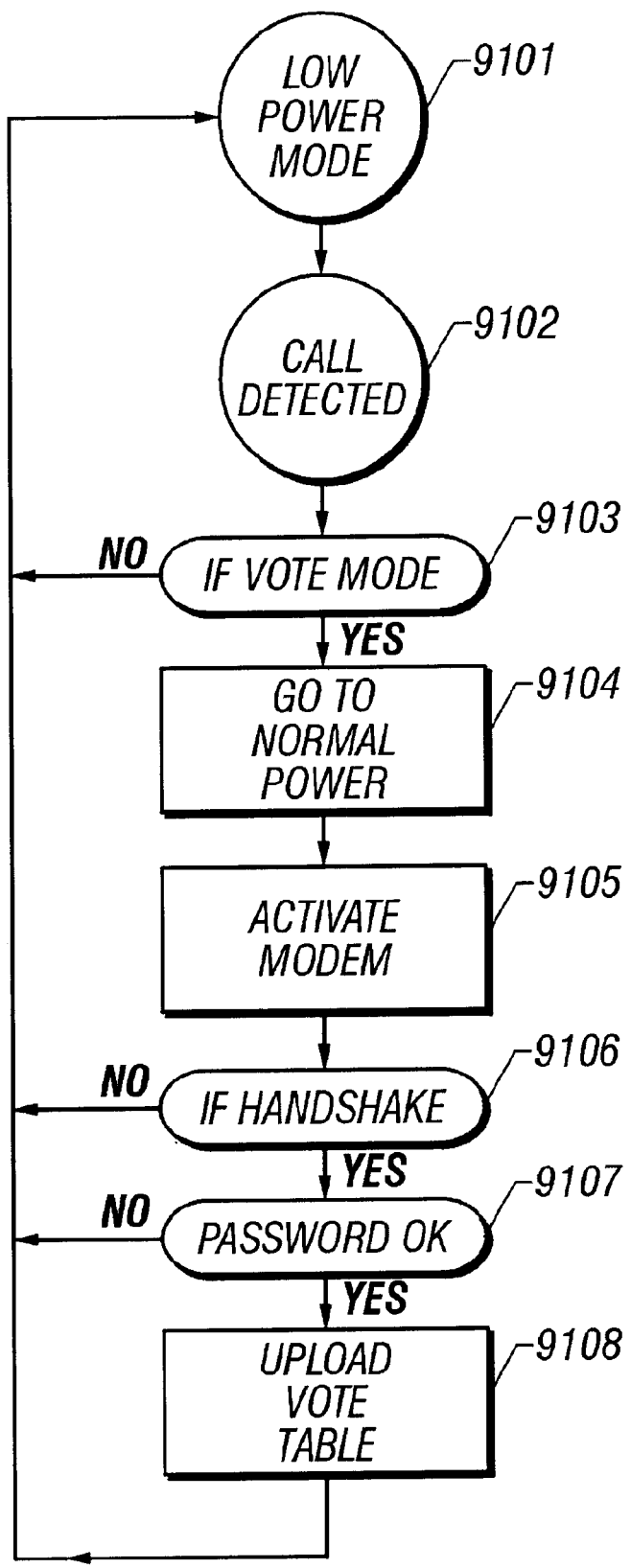

FIG. 9B is a flowchart of the process used to collect votes. The user places the RU in its cradle or otherwise connects it to an RJ-11 jack connected to the telephone line. The RU is in its low power mode (block 9101). At a convenient time, the host computer calls the user's RU phone number. The incoming call is detected (block 9102). The RU checks for the vote mode (block 9103). If not the vote mode, the call is rejected. If the vote mode is present, the RU goes to normal power (block 9104) and the modem is activated (block 9105). A handshake sequence is performed. If the handshake sequence does not pass, the call is rejected. If the handshake sequence does pass, the host sends a password and the password is tested (block 9107). If the password is incorrect, the call is rejected. If the password checks, then a vote table is uploaded (block 9108).

Figure 11:
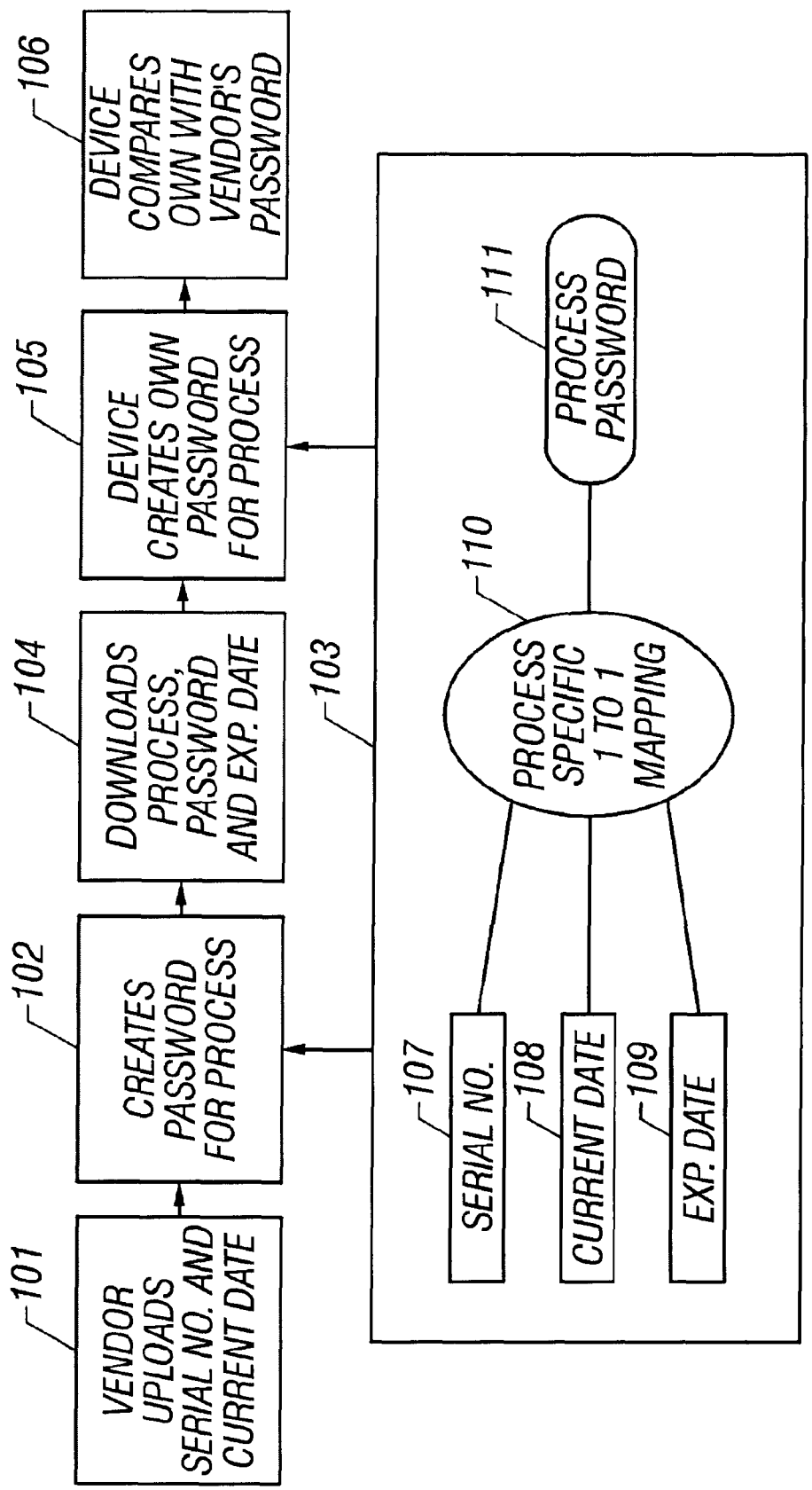
FIG. 11 shows a flowchart of a Process-Specific Password Generation and Usage scheme that may be used with the BMS invention.

FIG. 11 shows a flowchart of a Process-Specific Password Generation and Usage method that may be used with the invention. In accordance with such method, the vendor's order-taking computer, the provider's Host computer, and the RU each have a set of process-specific password generators 103 that require the RU serial number 107, the current date 108 and the expiration date 109 of the authorization to use the process. The method is carried out by the vendor or provider uploading the RU's serial number (block 101) and generating the process-specific password (block 102). The vendor/provider then downloads the process request and data along with the process-specific password and the expiration date of the process right (block 103). The RU then creates its own password based on the RU's serial number, the current date and the expiration date (block 105), and then compares the two passwords before executing the process (block 106). In this manner, secure passwords are created and used that assure only authorized users and vendors are permitted to use or benefit from the system during authorized time periods.

As described above, it is thus seen that the BMS of the present invention provides a low-cost store-and-forward device compatible with existing TV and radio receivers and the public telephone system which facilitates home shopping by capturing product ordering information, even in adverse surroundings (e.g., in the dark, without a pen or pencil, in a less-than-quiet environment). The captured product ordering information may then be used later to activate the order, via a telephone, or other suitable link with a vendor's or service provider's Host computer.

As further seen, the invention provides a Broadcast Marketing System that increases the effectiveness of all direct-response and institutional TV and radio advertising.

While the invention herein disclosed has been described by means of specific embodiments and applications thereof, numerous modifications and variations may be made thereto by those skilled in the art without departing from the scope of the invention set forth in the claims.

What is claimed is:

1. A handheld control unit for use with a broadcast receiver, such as a radio or television, said handheld control unit comprising:

means within said handheld control unit for generating control signals that are selectively transmitted via a wireless link to the broadcast receiver, said control signals including control signals for turning the broadcast receiver ON or OFF and selecting the station/channel to which the broadcast receiver is tuned; and memory means within said handheld control unit for storing startup control data provided by a broadcast marketer;

means within said handheld control unit for transmitting a power ON signal to the broadcast receiver via the wireless link in response to a power ON/OFF button of the handheld control unit being depressed, wherein the power ON signal causes the broadcast receiver to be turned ON;

means within said handheld control unit for automatically generating a startup control signal based on the startup control data stored in said memory means that directs the tuner of the broadcast receiver to a channel or station identified by the startup control data whenever the handheld control unit is used to turn the broadcast receiver ON; and means within said handheld control unit for automatically transmitting the startup control signal to the broadcast receiver via the wireless link in response to the power ON/OFF button of the handheld control unit being depressed, wherein the startup control signal causes the broadcast receiver to be tuned to the channel or station identified by the startup control data.

2. The handheld control unit as set forth in claim 1 further comprising:

modem means for selectively establishing a telecommunications link with a computer at a remote site; and processing means responsive to password data received from the computer at the remote site via the modem means for reprogramming the startup control data stored in the memory means;

whereby the channel or station to which the broadcast receiver is tuned when the handheld control unit is used to turn the broadcast receiver ON may be reprogrammed to a different channel or station.

3. The handheld control unit as set forth in claim 2 wherein said processing means is further responsive to second password data received from a remote computer site via the modem means for reprogramming the preferred channel data stored in the memory means;

whereby the channel or station to which the broadcast receiver is tuned when a given hot button is activated may be reprogrammed to a different channel or station.

4. The handheld control unit as set forth in claim 2 further including means for storing polling data within said memory means, said polling data comprising data the user stores in the memory means as prompted by information received over the broadcast receiver; and means for selectively uploading the polling data through the modem means to a computer at a remote site.

5. The handheld control unit as set forth in claim 2 further including means for generating viewing/listening log data that identifies those stations or channels to which the broadcast receiver has been tuned as controlled by said handheld control unit means for storing the viewing/listening log data within said memory means; and means for selectively uploading the viewing/listening log data through the modem means to a computer at a remote site.

6. The handheld control unit as set forth in claim 2 further comprising:

means for storing product identifying data embedded within an enhanced broadcast commercial broadcast by the broadcast receiver;

means for reviewing the stored product identifying data at a time subsequent to its receipt;

means for selecting a particular product associated with the reviewed product identifying data which a user of the handheld control unit desires to purchase; and means for transmitting the product identifying data associated with the product desired to be purchased through the modem means to a computer at a remote site, whereupon the computer at the remote site may facilitate completion of the sale of the product to the user.

* * * * *